(12) United States Patent
Taylor et al.

(10) Patent No.: US 12,485,609 B2
(45) Date of Patent: Dec. 2, 2025

(54) NOZZLES, NOZZLE ASSEMBLIES, AND RELATED METHODS

(71) Applicant: US Synthetic Corporation, Orem, UT (US)

(72) Inventors: Harris Taylor, Lehi, UT (US); Jacob Crockett, Orem, UT (US); Jarrett Meier, Lehi, UT (US); Scott Schmidt, Draper, UT (US); Michael James Gleason, Orem, UT (US); Brian Shuey, Eagle Mountain, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 17/713,161

(22) Filed: Apr. 4, 2022

(65) Prior Publication Data

US 2022/0324167 A1    Oct. 13, 2022

Related U.S. Application Data

(60) Provisional application No. 63/171,718, filed on Apr. 7, 2021.

(51) Int. Cl.
*B29C 64/00* (2017.01)
*B29C 64/106* (2017.01)
(Continued)

(52) U.S. Cl.
CPC .......... *B29C 64/209* (2017.08); *B29C 64/106* (2017.08); *B33Y 10/00* (2014.12); *B33Y 30/00* (2014.12)

(58) Field of Classification Search
CPC .................................................. B29C 64/209
See application file for complete search history.

(56) References Cited

U.S. PATENT DOCUMENTS

| 4,426,954 A | 1/1984 | Keller |
| 5,167,673 A | 12/1992 | Jones |

(Continued)

FOREIGN PATENT DOCUMENTS

| CN | 204094645 U | 1/2015 |
| CN | 107127969 A | 9/2017 |

(Continued)

OTHER PUBLICATIONS

Schreiner, Printhead for the Layer-by-Layer Application of Material, 2019, WIPO, (machine translated). (Year: 2019).*

(Continued)

*Primary Examiner* — Nicholas R Krasnow
(74) *Attorney, Agent, or Firm* — BKRIP LLC

(57) ABSTRACT

Embodiments are directed to nozzles for three-dimensional printing and related nozzle assemblies and methods. An example nozzle includes at least one top surface, at least one bottom surface, and at least one lateral surface extending from or near the top surface to or near the bottom surface. The nozzle includes at least one conduit surface defining a conduit. The conduit surface extends from or near the top surface to or near the bottom surface. In an embodiment, at least a portion of the conduit surface proximate to the top surface is non-vertical (e.g., defines a non-cylindrical or non-rectangular shape). The non-vertical conduit surface may be positioned such that it is not parallel to a central axis of the nozzle extending from the top surface to the bottom surface.

32 Claims, 10 Drawing Sheets

(51) Int. Cl.
  *B29C 64/209* (2017.01)
  *B33Y 10/00* (2015.01)
  *B33Y 30/00* (2015.01)

(56) References Cited

U.S. PATENT DOCUMENTS

| | | | |
|---|---|---|---|
| 5,363,556 | A | 11/1994 | Banholzer |
| 7,134,868 | B2 | 11/2006 | Babin |
| 7,172,142 | B2 | 2/2007 | Taylor |
| 8,512,023 | B2 | 8/2013 | Judd |
| 9,463,479 | B2 | 10/2016 | Park |
| 9,808,909 | B2 | 11/2017 | Nambiath |
| 2002/0142709 | A1 | 10/2002 | Massa |
| 2005/0189443 | A1 | 9/2005 | Taylor |
| 2011/0045124 | A1 | 2/2011 | Zuraw |
| 2014/0048969 | A1* | 2/2014 | Swanson ............... B29C 64/209 264/129 |
| 2017/0072614 | A1* | 3/2017 | Lind ...................... B29C 64/209 |
| 2017/0072632 | A1* | 3/2017 | Page ...................... B29C 64/106 |
| 2017/0157831 | A1* | 6/2017 | Mandel ................. B29C 64/106 |
| 2017/0252817 | A1* | 9/2017 | Mykulowycz ............ B22F 1/08 |
| 2017/0355138 | A1 | 12/2017 | Mark |
| 2017/0355142 | A1* | 12/2017 | Sterman ............... B29C 64/209 |
| 2018/0065318 | A1* | 3/2018 | Tyler ..................... B29C 64/209 |
| 2018/0079139 | A1* | 3/2018 | Wang ....................... B33Y 50/02 |
| 2018/0154580 | A1* | 6/2018 | Mark ....................... B22F 3/24 |
| 2018/0200955 | A1* | 7/2018 | Hoelldorfer ........... B33Y 30/00 |
| 2018/0318933 | A1* | 11/2018 | Myerberg ............... B22F 12/55 |
| 2019/0022934 | A1 | 1/2019 | Kobe |
| 2019/0022935 | A1* | 1/2019 | Leonardus van Tooren ............... B33Y 30/00 |
| 2019/0091929 | A1 | 3/2019 | Harrison |
| 2019/0255771 | A1* | 8/2019 | Ilies ...................... B29C 64/236 |
| 2020/0009794 | A1* | 1/2020 | Bracha ................. B29C 64/232 |
| 2020/0023492 | A1 | 1/2020 | Miller |
| 2020/0023579 | A1* | 1/2020 | Lynn ................... B29C 48/2694 |
| 2021/0387410 | A1* | 12/2021 | Moore ................... B33Y 30/00 |
| 2022/0088862 | A1* | 3/2022 | Sagr ........................ B05B 15/18 |
| 2022/0288848 | A1* | 9/2022 | MacNeish, III ....... B33Y 30/00 |
| 2023/0226760 | A1* | 7/2023 | Lan ...................... B29C 64/112 264/308 |

FOREIGN PATENT DOCUMENTS

| | | | |
|---|---|---|---|
| CN | 206676565 | U | 11/2017 |
| CN | 109094028 | A | 12/2018 |
| CN | 209257491 | U | 8/2019 |
| DE | 202019005744 | U1 | 10/2021 |
| EP | 0518591 | B1 | 2/1996 |
| EP | 1411143 | B1 | 7/2007 |
| GB | 594913 | A | 11/1947 |
| JP | S57106426 | A | 7/1982 |
| JP | S585711 | B2 | 2/1983 |
| JP | H0580269 | B2 | 11/1993 |
| JP | 2869611 | B2 | 3/1999 |
| KR | 20030023948 | A | 3/2003 |
| WO | 2005065836 | A1 | 7/2005 |
| WO | 2019079756 | A1 | 4/2019 |
| WO | WO-2019109114 | A1 * | 6/2019 ........... B29C 64/118 |
| WO | 2020255069 | A1 | 12/2020 |
| WO | WO2020239165 | A1 | 12/2020 |
| WO | 2022216631 | A1 | 10/2022 |

OTHER PUBLICATIONS

Schreiner, Printhead for the Layer-by-Layer Application of Material, 2019, Espacenet, (machine translated). (Year: 2019).*
International Search Report and Written Opinion for PCT/US2022/023234, Jul. 25, 2022, 12 pages.
Williams, "Rubies Are A 3D Printers Best Friend", Hackaday.com, Nov. 30, 2017, https://hackaday.com/2017/11/30/rubies-are-a-3d-printers-best-friend/.
3D Solex, "S5-UM3 Hardcore DIAMOND Nozzle", 3dsolex.com, Sep. 27, 2018, https://web.archive.org/web/20180927015623/https://3dsolex.com/product/3dsolex-everlast-diamond-nozzle/.
Carter, "3D Printer Nozzle Abrasion: Discover and understand the mechanisms behind your nozzle wear" Dyzedesign.com, Jun. 7, 2018, https://dyzedesign.com/2018/06/nozzle-abrasion-mechanisms-behind-nozzle-wear/.
Cnc Kitchen: "Mini Lathe Project: 3D Printer Nozzle", Jun. 27, 2020 (Jun. 27, 2020), XP093121824, Retrieved from the Internet: URL:https://www.youtube.com/watch?v=Zi5gA_tDE4Y [retrieved on Jan. 19, 2024].
PCT/US2023/034356, International Search Report, Feb. 1, 2024, 4 pages.
PCT/US2023/034356, Written Opinion, Feb. 1, 2024, 10 pages.

* cited by examiner

NOZZLES, NOZZLE ASSEMBLIES, AND RELATED METHODS

CROSS REFERENCE TO RELATED APPLICATIONS

This application claims the benefit of the filing date of U.S. Provisional Patent Application Ser. No. 63/171,718, titled "NOZZLES, NOZZLE ASSEMBLIES INCLUDING THE SAME, AND METHODS OF USING THE SAME," filed Apr. 7, 2021, the disclosure of which is hereby incorporated by this reference in its entirety.

BACKGROUND

Three-dimensional ("3D") printing is a method that includes dispensing a first layer of material onto a platform from a nozzle. Additionally layers of material may be dispensed from the nozzle onto the first and subsequent layers until an object is formed. However, several issues exist with conventional nozzles and conventional nozzle assemblies that include the nozzles, such as unsatisfactory leaking of the material being dispensed and excessive wear on the nozzles.

Therefore, new and improved nozzles and nozzle assemblies including such nozzles are needed.

SUMMARY

Embodiments are directed to nozzles for three-dimensional printing and related nozzle assemblies and methods of forming and using nozzles. In an embodiment, a nozzle for three-dimensional printing is disclosed. The nozzle may include at least one top surface, at least one bottom surface opposite the at least one top surface, at least one lateral surface, and at least one conduit surface extending from the at least one top surface to the at least one bottom surface. The at least one conduit surface defines a conduit. In some embodiments, at least a portion of the at least one conduit surface proximate to the at least one top surface is non-vertical. At least a portion of the at least one conduit surface includes at least one superhard material.

In an embodiment, a nozzle assembly for three-dimensional printing is disclosed. The nozzle assembly includes a base including an attachment portion configured to be attached to a printing device and a nozzle attached to the base. The nozzle may include at least one top surface, at least one bottom surface opposite the at least one top surface, at least one lateral surface, and at least one conduit surface extending from the at least one top surface to the at least one bottom surface. The at least one conduit surface defines a conduit. In some embodiments, at least a portion of the at least one conduit surface proximate to the at least one top surface is non-vertical. At least a portion of the at least one conduit surface includes at least one superhard material.

Some embodiments may include methods of forming and/or using the nozzles and nozzle assemblies.

For example, methods of forming a nozzle may include defining at least one conduit surface extending through the nozzle, extending at least a portion of the at least one conduit surface in a direction transverse to a central axis of the nozzle, and forming at least a portion of the at least one conduit surface with at least one superhard material.

In some embodiments, methods of using a nozzle in a three-dimensional printing process may include flowing a fluid (e.g., printing material) through a conduit of a nozzle defined by a conduit surface comprising at least one superhard material and directing fluid flow through the conduit with at least a portion of the conduit surface in a direction transverse to a central axis of the nozzle.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
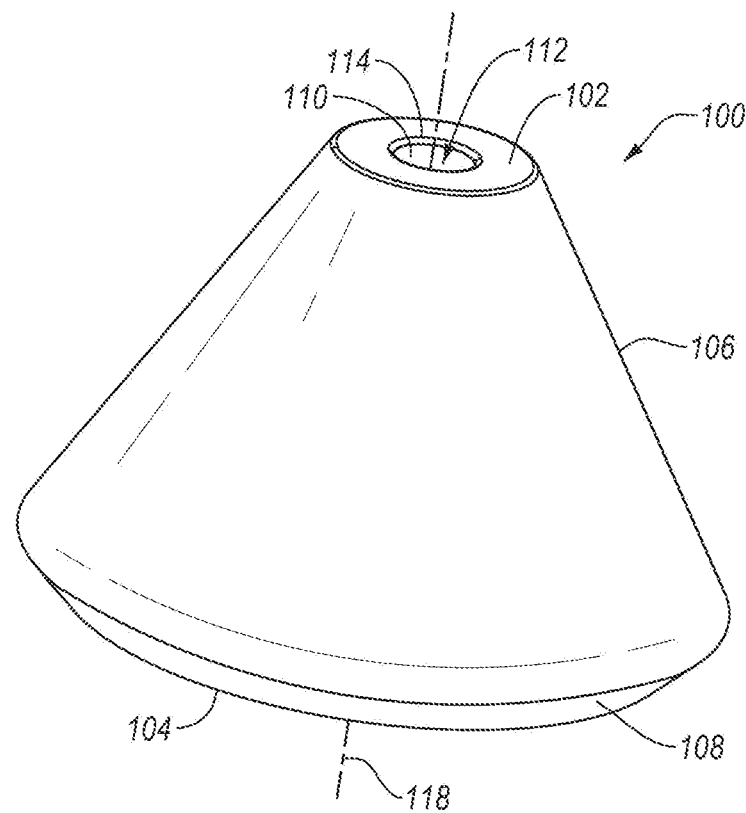
FIG. 1A is an isometric view of a nozzle, according to an embodiment.

The present disclosure relates to nozzles for three-dimensional printing and related nozzle assemblies and methods of forming and using the nozzles. An example nozzle includes at least one top surface, at least one bottom surface, and at least one lateral surface extending from or near the top surface to or near the bottom surface. The nozzle also includes at least one conduit surface defining a conduit. The conduit surface extends from or near the top surface to or near the bottom surface. In an embodiment, at least a portion of the conduit surface most proximate to the top surface is non-vertical (e.g., forms a non-cylindrical or non-rectangular shape, extends along an axis that is transverse to a central axis of the nozzle). In such an embodiment, the conduit surface is non-vertical when the conduit surface is not parallel (e.g., transverse) to a central axis of the nozzle extending from the top surface to the bottom surface.

Features of the nozzles disclosed herein may be configured to, for example, reduce the force required to push a printing material through the conduit, facilitate removal of a first printing material to prevent contamination of a second, different printing material that may subsequently flow through the conduit, prevent clogging of the conduit, improve heating of the printing material flowing through the nozzle, improve resolution of the printed material, and/or improve adhesion of different layers of the printed material. These features may be useful when flowing any printing material through the conduit but may be especially useful when an abrasive printing material flows through the nozzle. Abrasive printing materials may include printing materials exhibiting a hardness that is comparable to or greater than brass, steel, or other materials that are commonly used to form nozzles. Examples of abrasive printing materials include polymers with one or more particles (e.g., ceramic particles, metal particles, carbon fiber, etc.) disposed therein, a ceramic, a metal, a composite, or combinations thereof. It is noted that, as used herein, "printing material" refers to the material flowing through the conduit (e.g., a fluid or otherwise flowable material) and "printed material" refers to the material that has been dispensed from the nozzle.

The features of the nozzle disclosed herein may form features that are more likely to be worn away when the abrasive printing material flows through the conduit thereby reducing the benefits of the features disclosed herein. As such, in some embodiments, the nozzles disclosed herein may be at least partially comprise (or be formed from) at least one of polycrystalline diamond ("PCD"), polycrystalline cubic boron nitride ("PcBN"), another superhard material exhibiting a hardness that is equal to or greater than tungsten carbide, and/or a combination of any of the foregoing. For example, the nozzles may be formed such that the features of the nozzles disclosed herein may be defined by and/or formed by PCD, PcBN, or another superhard material. Further, it is noted that forming at least a portion of the nozzles disclosed herein from at least one of PCD or PcBN may improve the thermal conductivity of the nozzle thereby improving heating of the printing material than if the nozzle was formed from another superhard material.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "upper," "lower," and "lateral" refer to the orientations as depicted in the figures.

Figure 1B:
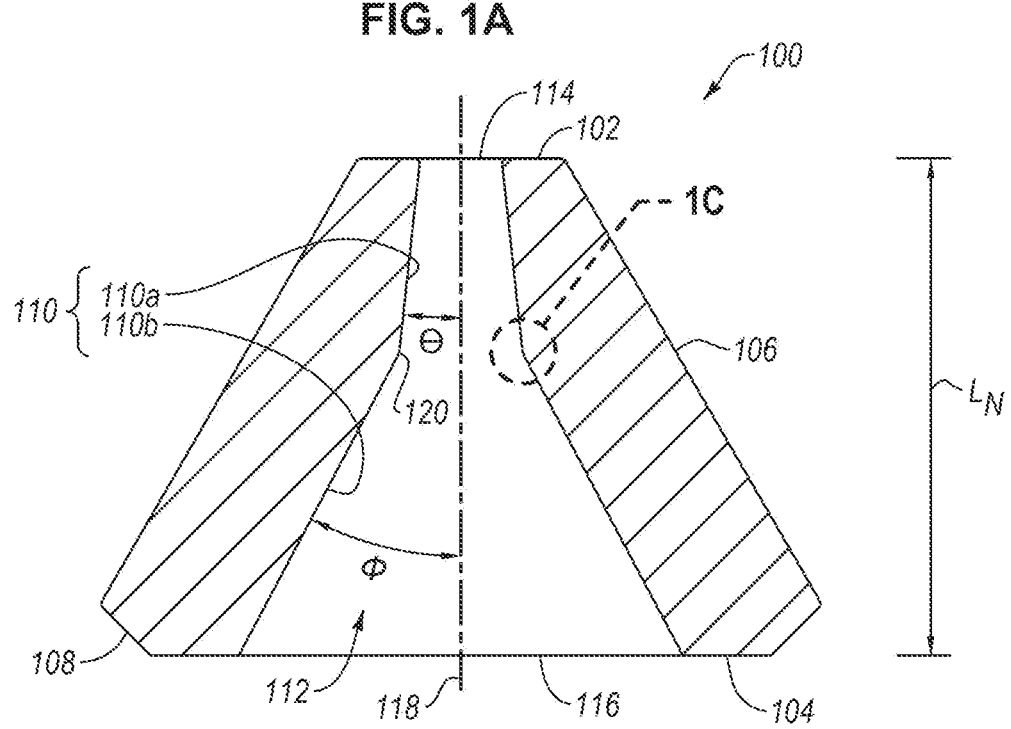
FIG. 1B is a cross-sectional schematic of the nozzle taken along plane 1B-1B shown in FIG. 1A, according to an embodiment.

FIG. 1A is an isometric view of a nozzle 100, according to an embodiment. FIG. 1B is a cross-sectional schematic of the nozzle 100 taken along plane 1B-1B shown in FIG. 1A, according to an embodiment. The nozzle 100 includes at least one top surface 102, at least one bottom surface 104 opposite the top surface 102, at least one lateral surface 106, and, optionally, one or more chamfers (e.g., chamfer 108). In the illustrated embodiment, the lateral surface 106 extends from the top surface 102 to a location that is near the bottom surface 104 (e.g., to the chamfer 108 extending between the bottom surface 104 and the lateral surface 106). However, it is noted that the lateral surface 106 may at least one of extend from a location that is near the top surface 102 when the nozzle 100 includes an outer chamfer extending between the top surface 102 and the lateral surface 106 or to the bottom surface 104 when the chamfer 108 is omitted. The nozzle 100 also includes at least one conduit surface 110 defining a conduit 112. At least a portion of the conduit surface 110 may include at least one superhard material exhibiting a hardness that is equal to or greater than tungsten carbide. Such a configuration may limit wear of the conduit surface 110. In an embodiment, as illustrated, the conduit surface 110 extends from the top surface 102 to the bottom surface 104. However, the nozzle 100 may include one or more chamfers extending from at least one of the top surface 102 or the bottom surface 104 to the conduit surface 110. The top surface 102 and/or the conduit surface 110 define an orifice 114 through which the printing materials are dispensed from the nozzle 100 and the bottom surface 104 and/or the conduit surface 110 define an opening 116 through which the conduit 112 may receive the printing material.

As previously discussed, the top surface 102 of the nozzle defines the orifice 114. The orifice 114 may exhibit a maximum lateral dimension (e.g., diameter) that is about 0.25 mm, about 0.4 mm, about 0.6 mm, about 0.8 mm, about 1.0 mm, about 0.1 mm or greater, about 0.2 mm or greater, about 0.4 mm or greater, about 0.6 mm or greater, about 0.8 mm or greater, about 1 mm or greater, about 1.5 mm or greater, about 2 mm or greater, about 3 mm or less, about 2 mm or less, about 1 mm or less, about 0.75 mm or less, about 0.5 mm or less, or in ranges of about 0.1 mm to about 0.3 mm, about 0.2 mm to about 0.4, about 0.3 mm to about 0.5 mm, about 0.4 mm to about 0.6 mm, about 0.5 mm to about 0.7 mm, about 0.6 mm to about 0.8 mm, about 0.7 mm to about 0.9 mm, about 0.8 mm to about 1 mm, about 0.9 mm to about 1.5 mm, about 1 mm to about 2 mm, or about 1.5 mm to about 3 mm. The maximum lateral dimension of the orifice 114 may affect the achievable resolution of the printed material and rate at which the nozzle 100 may dispense the printing material. For example, increasing the maximum lateral dimension of the orifice 114 may increase the rate at which the nozzle 100 may dispense the printing material but may decrease the achievable resolution of the printing material.

The top surface 102 may exhibit a surface area that is about 0.075 $mm^2$ or greater, about 0.1 $mm^2$ or greater, about 0.2 $mm^2$ or greater, about 0.3 $mm^2$ or greater, about 0.5 $mm^2$ or greater, about 0.7 $mm^2$ or greater, about 1 $mm^2$ or greater, about 1.25 $mm^2$ or greater, about 1.5 $mm^2$ or greater, about 2 $mm^2$ or greater, about 3 $mm^2$ or greater, about 4 $mm^2$ or greater, or in ranges of about 0.075 mm² to about 0.2 mm², about 0.1 mm² to about 0.3 mm², about 0.2 mm² to about 0.4 mm², about 0.3 mm² to about 0.5 mm², about 0.4 mm² to about 0.6 mm², about 0.5 mm² to about 0.7 mm², about 0.6 mm² to about 0.8 mm², about 0.7 mm² to about 0.9 mm², about 1 mm² to about 1.25 mm², about 1 mm² to about 1.5 mm², about 1.25 mm² to about 1.75 mm², about 1.5 mm² to about 2 mm², about 1.75 mm² to about 3 mm², or about 2 mm² to about 4 mm². In an example, the surface area of the top surface 102 may be selected based on the maximum lateral dimension of the orifice 114 since increasing the maximum lateral dimension of the orifice 114 may result in an increase of the surface area of the top surface 102. In an example, the surface area of the top surface 102 may be selected to be a relatively small which may decrease the likelihood that the top surface 102 contacts the printed material during use and/or decrease the adverse effect (e.g., smudging, dragging, or flattening) of the top surface 102 contacting the printed material.

In an embodiment, as illustrated, the top surface 102 may be generally planar. In an embodiment, at least a portion of the top surface 102 may be non-planar, such as curved or tapered. The top surface 102 that is at least partially curved or tapered may decrease the likelihood that the top surface 102 contacts the printed material during use. For example, the nozzle assembly (illustrated in FIGS. 11-13) may not extend perpendicular to the printed material. The curved or tapered portions of the top surface 102 may prevent portions of the top surface 102 from contacting the printed material that would otherwise protrude or be more likely to contact the printed material if the top surface 102 was planar due to the non-perpendicular angle of the printing system relative to the printed material.

The bottom surface 104 is configured to contact one or more surfaces of the base ("base contact surface"). An example of the base contact surface is base contact surface 1142 of FIG. 11. The bottom surface 104 may exhibit a surface topography that generally corresponds to base contact surface. For example, the bottom surface 104 may exhibit a generally planar topography when base contact surface is also generally planar. Selecting the bottom surface 104 to exhibit a surface topography that generally corresponds to the base contact surface may reduce the size of gaps present between the bottom surface 104 and the base contact surface. Gaps present between the bottom surface 104 and base contact surface may allow printing material to leak between the bottom surface 104 and the base contact surface. The printing material leaking between the bottom surface 104 and the base contact surface may result in material being discharged from a portion of the nozzle assembly other than the orifice 114. The printing material leaking between the bottom surface 104 and the base contact surface may also result in contamination of the printed material. For example, the leaked printing material may be cured or compositionally differently than a printing material subsequently flowing through the conduit 112, the mixing of either of which with the printing material flowing through the conduit 112 may result in printing flaws. In an embodiment, the bottom surface 104 may be generally parallel to the top surface 102.

At least a portion of the lateral surface 106 is non-vertical (e.g., extends in a plane that would intersect a central axis 118 of the nozzle 100). The lateral surface 106 may be non-vertical, for example, when the lateral surface 106 is non-parallel (e.g., transverse) to the central axis 118 of the nozzle 100 (e.g., an axis that extends from a center of the top surface 102 to a center of the bottom surface 104). For example, at least about 55%, at least about 60%, at least about 70%, at least about 80%, at least about 90%, about 100% (as shown), or in ranges of about 55% to about 70%, about 60% to about 80%, about 70% to about 90%, or about 80% to about 100% of the lateral surface 106 is non-vertical. The percentage of the lateral surface 106 that is non-vertical may relate to the percentage of at least one of the surface area, the percentage of the length $L_N$ of the nozzle 100 along which the lateral surface 106 is non-vertical, or a length of the lateral surface 106 measured along a shortest path from the top surface 102 to the bottom surface 104 (including or excluding any chamfers) that extends along an exterior of the lateral surface 106 that is non-vertical. Selecting the percentage of the lateral surface 106 that is non-vertical to be greater than 55% and, further, increasing the percentage of the lateral surface 106 that is non-vertical may facilitate attachment of the nozzle 100 to a base. For example, as will be discussed in more detail below, the nozzle 100 may be positioned within a recess defined in the base and may be attached to the base. The recess may define a recess opening (e.g., after swaging) that is less than one or more dimensions (e.g., less than a maximum lateral dimension $D_N$) of the nozzle 100 which prevents the nozzle 100 from leaving the recess and secures the nozzle 100 to the base. Increasing the percentage of the lateral surface 106 that is non-vertical may allow more of the lateral surface 106 to be contacted by the surfaces of the base that define the recess thereby better securing the nozzle 100 to the recess. Further, increasing the percentage of the nozzle 100 that is non-vertical, such as portions of the nozzle 100 that are more proximate to the bottom surface 104, increases the distance that the top surface 102 may protrude from the base. Examples of the angles that the lateral surface 106 may extend relative to the central axis 118 are disclosed in U.S. Provisional Patent No. 63/171,708, filed on Apr. 7, 2021, the disclosure of which is incorporated herein, in its entirety, by this reference.

In an embodiment, the lateral surface 106 includes a generally conically shaped surface. However, the lateral surface 106 may include a plurality of surfaces or a non-conical surface, without limitation. In an example, the lateral surface 106 may include a plurality of surfaces, wherein an angle that each surface of the lateral surface 106 extends relative to the central axis 118 may be different. The plurality of lateral surfaces 106 may facilitate attachment of the nozzle 100 to the base and may increase the distance that the top surface 102 of the nozzle 100 may extend above the base. In an example, at least a portion of the lateral surface 106 may exhibit a generally prism shape, a generally frustum shape, a generally cylindrical shape, or any other suitable shape.

As previously discussed, the nozzle 100 includes the chamfer 108 extending from the bottom surface 104 to the lateral surface 106. Any of the chamfers disclosed herein include one or more transitional surfaces between two other surfaces and, except as otherwise disclosed herein, may include one or more rounded surfaces (e.g., a rounded surface exhibiting an average radius of curvature that is greater than about 0.025 mm, greater than about 0.05 mm, greater than about 0.1 mm, or greater than about 0.2 mm) and/or one or more planar surfaces. The chamfer 108 may facilitate insertion of the nozzle 100 into a recess defined by the base to which the nozzle 100 is attached in comparison to insertion of the nozzle 100 if such nozzle 100 included a sharp corner (e.g., a surface exhibiting an average radius of curvature that is less than 0.2 mm) between the bottom surface 104 and the lateral surface 106.

At least a portion of at least one of the top surface 102, the bottom surface 104, the lateral surface, or any other exterior surface of the nozzle 100 (e.g., the chamfer 108) may be polished to exhibit a root mean square ("RMS") surface roughness that is about 3 µm or less, about 2 µm or less, about 1.5 µm or less, about 1 µm or less, about 750 nm or less, about 500 nm or less, about 300 nm or less, about 200 nm or less, about 100 nm or less, about 75 nm or less, about 50 nm or less, about 30 nm or less, about 15 nm or less, or about 15 nm to about 50 nm, about 30 nm to about 75 nm, about 50 nm to about 100 nm, about 75 nm to about 200 nm, about 100 nm to about 300 nm, about 200 nm to about 500 nm, about 300 nm to about 750 nm, about 500 nm to about 1 µm, about 750 nm to about 1.5 µm, about 1 µm to about 2 µm, about 1.5 µm to about 3 µm. In an example, decreasing the RMS surface roughness of at least a portion of the top surface 102 may decrease the coefficient of friction between the polished portion of the top surface 102 and the printed material. As such, the polished portion of the top surface 102 may be less likely to pull portions of the printed material in the direction that the nozzle 100 moves relative to the printed material when the top surface 102 contacts the printed material. In an example, contacting a polished portion of the top surface 102 against the printed material may cause the top surface 102 to impart a smooth surface to the printed material which may be used to influence (e.g., improve) the deposition of the next layer of printed material on the already printed material and/or may impart a desired shape to the printed material. In an example, polishing the bottom surface 104 and/or the lateral surface 106 to any of the RMS surface roughness discussed above may reduce gaps between the bottom surface 104 and/or the lateral surface 106 and the base that would otherwise form therebetween. Reducing gaps between the bottom surface 104 and/or the lateral surface 106 and the base may prevent or inhibit the printing material leaking between the nozzle 100 and the base.

Referring to FIG. 1B, the conduit surface 110 includes a portion that is closest to the top surface 102 ("top portion of the conduit surface"). The top portion of the conduit surface 110 includes the portion of the conduit surface 110 that extends a non-zero distance from the top surface 102 (e.g., first conduit surface 110a) and/or a chamfer extending between the top surface 102 and the conduit surface 110 (e.g., chamfer 724 or 824 illustrated in FIGS. 7 and 8). For example, the distance that the top portion of the conduit surface 110 extends may be at least about 0.25 mm, at least about 0.5 mm, or at least about 1 mm.

A portion of the conduit surface 110 (e.g., the top or upper portion proximate the orifice 114) may be non-vertical (e.g., extends in a plane that would intersect a central axis 118 of the nozzle 100). For example, where the cross-section of the top portion of the conduit surface 110 is non-parallel (e.g., set transverse) to a central axis 118 of the nozzle 100. Stated in another way, the portion of the conduit surface 110 may extend laterally or radially inward and/or laterally or radially outward relative to the central axis 118. Such portions of the conduit surface 110 set and extending at one or more oblique angles relative to the central axis 118 may define surfaces that gradually expand or contract the cross-section volume of the orifice 114.

As such, the top portion of the conduit surface 110 may not exhibit a generally cylindrical shape or a generally rectangular shape since such shapes include vertical surfaces (e.g., aligned with the central axis 118). Surprisingly, it has been found that the non-verticality of the top portion of the conduit surface 110 may decrease the force required to push the printing material through the conduit 112 in comparison to the force required to push the printing material through the conduit if the top portion of the conduit surface 110 were vertical. The non-verticality of the top portion of the conduit surface 110 allows a more gradual reduction of a width (e.g., measured perpendicular to the central axis 118) of the conduit 112 than if the top portion of the conduit surface 110 were vertical. It is currently believed that, at least in part, a gradual reduction in the width of the conduit 112 may decrease the force required to move the printing material through the conduit 112. The decreased force required to push the printing material through the conduit 112 may also decrease the likelihood that the printing material leaks between the nozzle 100 and the base. It has also been surprisingly found that the non-verticality of the conduit 112 may reduce the likelihood that the conduit 112 becomes clogged while flowing the printing material through the conduit 112.

Further, unexpectedly, it has been found that the non-verticality of the top portion of the conduit surface 110 may allow for more complete removal of the printing material from the conduit 112. The printing material may be removed from the conduit 112, for example, after completing a printing process to prevent the printing material that remains in the conduit 112 from drying, solidifying, or clogging the conduit 112 thereby preventing further use of the nozzle 100. Alternatively, or additionally, the printing material may be removed from the conduit 112 after printing a first material from the nozzle 100 and before printing a second material from the nozzle 100 that is different than the first material to prevent the first printing material from contaminating the second material. It has been found that, when the top portion of the conduit surface 110 is vertical, removing the printing material from the conduit 112 results in the formation of strings of printing material in and extending from the conduit 112. At least some of the strings of the printing material may remain in the conduit 112 after removing the rest of the printing material and the strings of the printing material that remain in the conduit 112 may be difficult to completely remove from the conduit 112. However, unexpectedly, it has been found that the non-verticality of the top portion of the conduit surface 110 prevents the formation of the strings of printing material or at least decreases the quantity of the strings of printing material that form as compared to the quantity of strings of printing material that would form if the top portion of the conduit surface 110 were vertical. Further, if strings of printing material form when removing the printing material, the non-verticality of the top portion of the conduit surface 110 allows more of the strings to be removed from conduit 112 than if the top portion of the conduit surface 110 were vertical. Not wishing to be bound by any theory, it is currently believed that, when the conduit surface 110 includes a plurality of conduit surfaces, the intersections (i.e., corners or edges) between different surfaces of the conduit surface 110 causes the formation of the strings. The non-verticality of the top portion of the conduit surface 110 may make the intersections between different surface of the conduit surface 110 less pronounced (e.g., the difference between the angles θ and φ is smaller) than if the top portion of the conduit surface 110 was vertical. It is believed that the less pronounced intersections formed due to the non-verticality of the top portion of the conduit surface 110 reduces the formation of strings and allows for more complete removal of the printing material than if the top portion of the conduit surface 110 was vertical. It is noted that the less pronounced intersections may also reduce the force required to push the printing material through the conduit 112 and reduce the likelihood that the printing material becomes clogged during operation.

Figure 7:
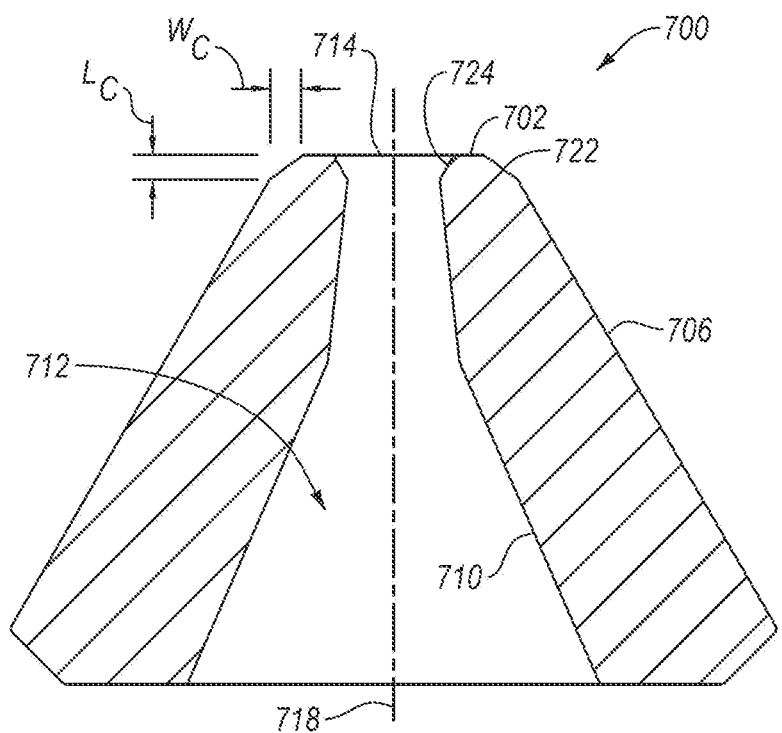
FIGS. 7 and 8 are cross-sectional schematics of different nozzles that each include chamfers extending from the top surfaces thereof to the lateral surfaces or conduit surfaces thereof, according to different embodiments.
Figure 8:
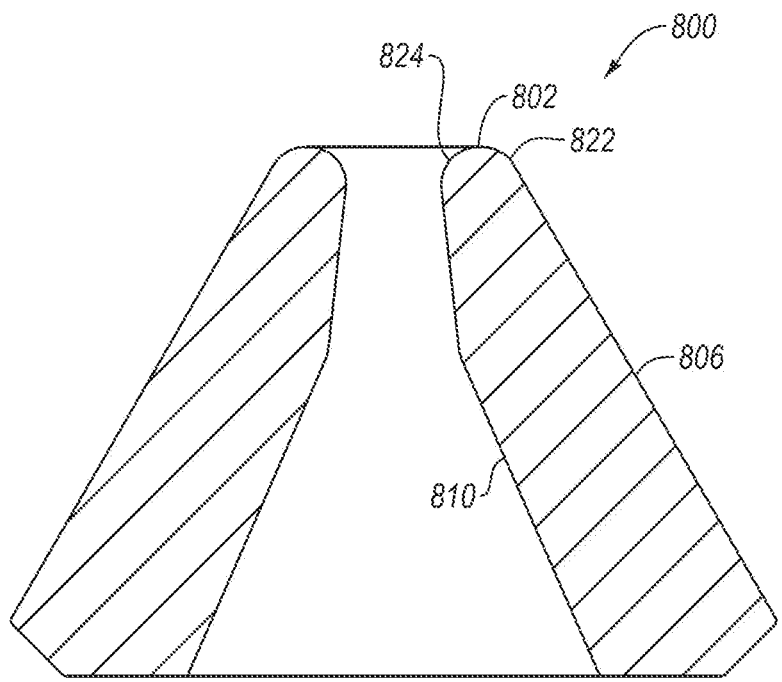

As illustrated in FIG. 1B, the conduit surface 110 includes a first conduit surface 110a and a second conduit surface 110b. The first conduit surface 110a extends from the top surface 102 (as shown) or may extend from a chamfer extending between the top surface 102 and the conduit surface 110a (as shown in FIGS. 7 and 8) to the second conduit surface 110b. The second conduit surface 110b extends from the first conduit surface 110a towards (e.g., to) the bottom surface 104 (as shown). Configuring the conduit surface 110 to include a plurality of surfaces makes the edges formed between such surfaces less pronounced. The conduit surfaces will make the edges formed between the conduit surface 110 and the bottom surface 104 less pronounced. Thus, the plurality of conduit surfaces 110 may provide one or more of the following benefits: reduce the force required to push the printing material through the conduit 112; reduce the likelihood that the printing material becomes clogged during operation; and/or prevent or decrease the likelihood that strings of printing material are formed when removing the printing material from the conduit 112 as compared to the likelihood that strings of printing material would be formed if the conduit surface 110 only included a single conduit surface.

In the illustrated embodiment, the first conduit surface 110a may at least partially form the top portion of the conduit surface 110. As such, the first conduit surface 110a may be non-vertical. In an example, as illustrated, the first conduit surface 110a may form a generally frustoconical shape. In such an example, the first conduit surface 110a may extend at an angle θ relative to the central axis 118. In an example, the first conduit surface 110a may exhibit a generally converging shape (e.g., a generally tapered shape with a curved side wall, such as a side wall that forms a concave or convex shape when viewed in cross-section), a truncated generally polyhedron shape (e.g., the walls of the truncated generally polyhedron shape may extend at the angle θ relative to the central axis 118), or any other suitable shape. It is noted that the generally truncated generally polyhedron shape and other shapes that the first conduit surface 110a may include intersecting surfaces that may increase the formation of strings of the printing material when removing the printing material than if the first conduit surface 110a exhibited intersecting surfaces, such as a frustoconical shape or a generally converging shape. However, such edges of such shapes may be less likely to form strings of the printing material when removing the printing material than if the first conduit surface 110a exhibited a generally cylindrical shape or another shape.

It is noted that, in some embodiments, the first conduit surface 110a may exhibit a shape that includes non-vertical and vertical surfaces, such as a truncated generally triangular prism shape. Such shapes may increase (compared to shapes that only include vertical surfaces) and decrease (compared to shapes that do not include vertical surfaces) the force required to push the printing material through the conduit 112, the likelihood that the printing material becomes clogged, and/or the likelihood that strings of printing material are formed when removing the printing material from the conduit 112.

When the first conduit surface 110a extends at an angle θ relative to the central axis 118 (e.g., the first conduit surface 110a exhibits a truncated generally conical or polyhedron shape), the angle θ may be selected to be about 1° or greater, about 2° or greater, about 3° or greater, about 4° or greater, about 5° or greater, about 6° or greater, about 7° or greater, about 8° or greater, about 9° or greater, about 10° or greater, about 12° or greater, about 14° or greater, about 18° or greater, about 20° or greater, about 25° or greater, about 30° or greater, about 35° or greater, about 40° or greater, about 45° or greater, or in ranges of about 1° to about 3°, about 2° to about 4°, about 3° to about 5°, about 4° to about 6°, about 5° to about 7°, about 6° to about 8°, about 7° to about 9°, about 8° to about 10°, about 9° to about 12°, about 10° to about 14°, about 12° to about 16°, about 14° to about 18°, about 16° to about 20°, about 18° to about 25°, about 20° to about 30°, about 25° to about 35°, about 30° to about 40°, or about 35° to about 45°. The angle θ may be selected based on one or more factor. In an example, the angle θ may be selected to be greater than about 4° since the first conduit surface 110a may start behaving similar to a vertical conduit surface when the angle θ is less than 4°. As used herein, the term "vertical" means the angle θ is between 0° and 1°. In an example, the angle θ may be selected based on the method used to form the conduit 112, since some methods of forming the conduit 112 may only be able to form the first conduit surface 110a at certain angles θ relative to the central axis 118. In an embodiment, the angle θ may be selected based on the angle φ that the second conduit surface 110b extends relative to the central axis 118 since, generally, the angle φ may be selected to be greater than the angle θ, which may decrease the force required to push the printing material through the conduit 112.

The second conduit surface 110b may also be non-vertical, thereby allowing the width of the conduit 112 to generally decrease along a path of the conduit 112 from the opening 116 to the orifice 114. In an example, the non-verticality of the second conduit surface 110b may form a truncated generally conical shape. In such an example, the second conduit surface 110b may extend at an angle φ relative to the central axis 118. In an example, the second conduit surface 110b may exhibit a generally converging shape, a truncated generally polyhedron shape, a generally frustoconical shape, or any other suitable shape. The second conduit surface 110b may form the same or different shape as formed by the first conduit surface 110a.

When the second conduit surface 110b extends at an angle φ relative to the central axis 118 (e.g., the second conduit surface 110b exhibits a truncated generally conical or generally polyhedron shape), the angle φ may be selected to be about 5° or greater, about 6° or greater, about 7° or greater, about 8° or greater, about 9° or greater, about 10° or greater, about 12° or greater, about 14° or greater, about 18° or greater, about 20° or greater, about 25° or greater, about 30° or greater, about 35° or greater, about 40° or greater, about 45° or greater, about 50° or greater, about 55° or greater, about 60° or greater, about 65° or greater, about 70° or greater, or in ranges of about 5° to about 7°, about 6° to about 8°, about 7° to about 9°, about 8° to about 10°, about 9° to about 12°, about 10° to about 14°, about 12° to about 16°, about 14° to about 18°, about 16° to about 20°, about 18° to about 25°, about 20° to about 30°, about 25° to about 35°, about 30° to about 40°, about 35° to about 45°, about 40° to about 50°, about 45° to about 55°, about 50° to about 60°, about 55° to about 65°, or about 60° to about 70°. The angle φ may be selected based on one or more factor. In an example, the angle φ may depend on the angle θ of the first conduit surface 110a since, as previously discussed, the angle φ is selected to be greater than the angle θ. In an example, the angle φ may be selected such that the opening 116 exhibits a size comparable to the size of the passageway of the base (e.g., passageway 1158 of FIG. 11). In such an example, the angle φ may also be selected based on the length $L_N$ of the nozzle 100 and the length that the first conduit surface 110a extends along the central axis 118 since these factors may affect the angle ϕ needed to form an opening 116 exhibiting a size comparable to the size of the passageway of the base.

Figure 1C:
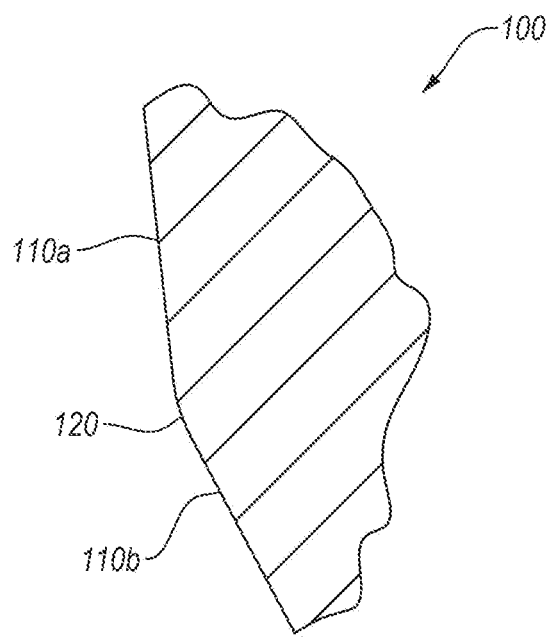
FIG. 1C is an enlarged view of the portion of the nozzle within the circle 1C illustrated in FIG. 1B, according to an embodiment.

FIG. 1C is an enlarged view of the portion of the nozzle 100 within the circle 1C illustrated in FIG. 1B, according to an embodiment. As shown in FIG. 1C, the first and second conduit surfaces 110a, 110b may meet at an intersection 120. As previously discussed, the intersection 120 may cause the formation of strings of the printing material when removing the printing material from the conduit 112. The intersection 120 may be rounded, which makes the intersection 120 less pronounced and may reduce the likelihood that the intersection 120 causes the formation of the strings of the printing material when the printing material is removed from the conduit 112 than if the intersection 120 was not rounded. The intersection 120 may be rounded when the intersection 120 exhibits a radius of curvature that is about 0.1 mm or greater, about 0.15 mm or greater, about 0.2 mm or greater, about 0.3 mm or greater, about 0.4 mm or greater, about 0.5 mm or greater, about 0.6 mm or greater, about 0.7 mm or greater, about 0.8 mm or greater, about 0.9 mm or greater, about 1 mm or greater, or in ranges of about 0.1 mm to about 0.2 mm, about 0.15 mm to about 0.3 mm, about 0.2 mm to about 0.4 mm, about 0.3 mm to about 0.5 mm, about 0.4 mm to about 0.6 mm, about 0.5 mm to about 0.7 mm, about 0.6 mm to about 0.8 mm, about 0.7 mm to about 0.9 mm, or about 0.8 mm to about 1 mm. Generally, increasing the average radius of curvature of the intersection 120 may reduce the likelihood that the intersection 120 causes the formation of the strings of the printing material.

Figure 1D:
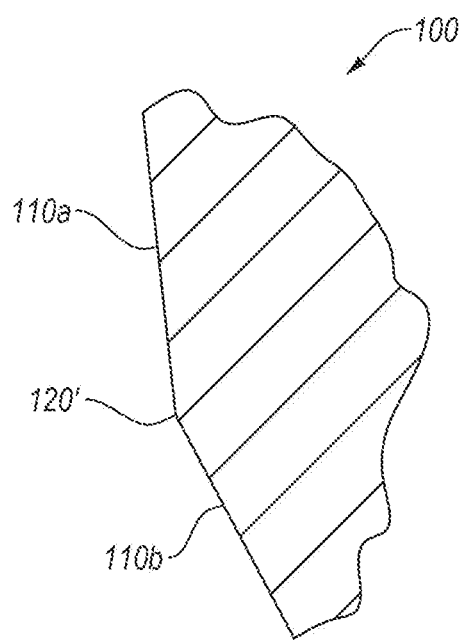
FIG. 1D is an enlarged view of the portion of the nozzle within the circle 1C illustrated in FIG. 1B, according to a different embodiment than what is illustrated in FIG. 1C.

FIG. 1D is an enlarged view of the portion of the nozzle 100 within the circle 1C illustrated in FIG. 1B, according to another embodiment. As shown in FIG. 1D, the first and second conduit surfaces 110a, 110b meet at an intersection 120' that is not rounded. The intersection 120' is not rounded when the intersection 120' exhibits an average radius of curvature that is less than 0.1 mm. The non-rounded intersection 120' may increase the likelihood that the intersection 120' causes the formation of strings of printing material when the printing material is removed from the conduit 112 compared to the intersection 120 illustrated in FIG. 1C. However, forming the intersection 120' may reduce the amount of manufacturing effort required to form the nozzle 100 compared to forming the intersection 120 illustrated in FIG. 1C. Further, the intersection 120' forms a feature when the printing material flows through the conduit 112 such that the intersection 120' may be likely to wear at a greater rate than the rest of the nozzle 100. The wearing of the intersection 120' may cause the intersection 120' to become rounded relatively quickly thereby reducing the likelihood that the intersection 120' causes the formation of strings of the printed material.

Figure 2:
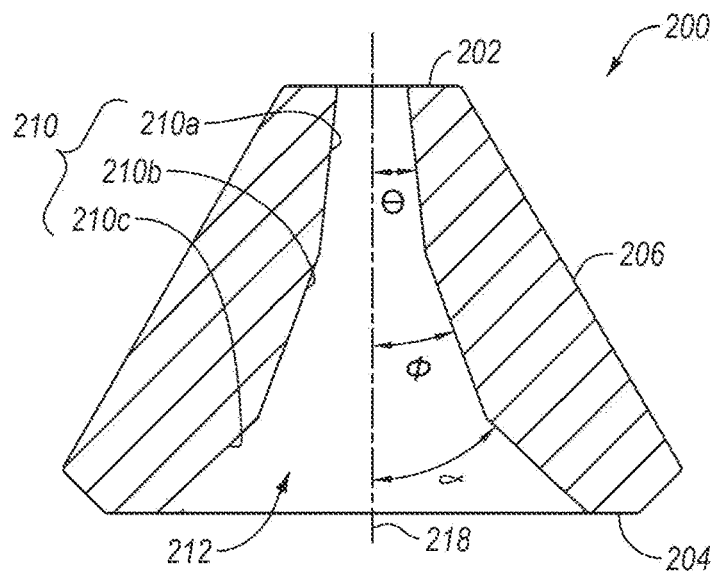
FIG. 2 is a cross-sectional schematic of a nozzle, according to an embodiment.

The conduit surfaces disclosed herein may include three or more conduit surfaces, such as a first conduit surface, a second conduit surface, and at least one additional conduit surface (e.g., third conduit surface). The first conduit surface may extend from or near the top surface of the nozzle to the second conduit surface, the second conduit surface may extend between the first conduit surface and the at least one additional conduit surface, and the at least one additional conduit surface may extend from the second conduit surface to or near the bottom surface. FIG. 2 is a cross-sectional schematic of a nozzle 200, according to an embodiment. Except as otherwise disclosed herein, the nozzle 200 may include one or more features which are the same or substantially similar to any of the one or more features of other nozzle embodiments disclosed herein, without limitation. For example, the nozzle 200 may include a top surface 202, a bottom surface 204, at least one lateral surface 206, and a plurality of conduit surfaces 210 defining a conduit 212.

The conduit surfaces 210 of the nozzle 200 includes a first conduit surface 210a, a second conduit surface 210b, and a third conduit surface 210c. Inclusion of the third conduit surface 210c further makes the edges formed between the conduit surfaces 210 less pronounced thereby decreasing the quantity of strings of material formed when removing the printing material and decreases the force required to push the printing material through the conduit 212.

The first conduit surface 210a extends from or near the top surface 202 at an angle θ relative to the central axis 218. The second conduit surface 210b extends between the first and third conduit surfaces 210a, 210c at an angle ϕ relative to the central axis 218 that is greater than the angle θ. The third conduit surface 210c extends from the second conduit surface 210c towards (e.g., to or near) the bottom surface 204 at an angle α relative to the central axis 218 that is greater than the angle ϕ. The angles θ, ϕ, and α may include any of the angles discussed above.

It is noted that the nozzle 200 may include one or more additional conduit surfaces in addition to the first, second, and third conduit surfaces 210a, 210b, 210c. The additional conduit surface(s) may extend from the third conduit surface 210c toward (e.g., to or near) the bottom surface 204. The additional conduit surfaces may further decrease the edges formed between the conduit surfaces 210 thereby decreasing the quantity of strings of material formed when removing the printing material and decreases the force required to push the printing material through the conduit 212.

Figure 3:
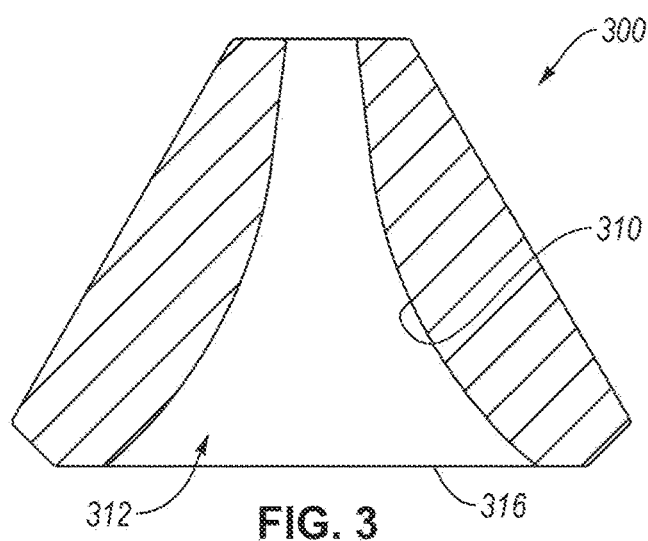
FIGS. 3 and 4 are cross-sectional schematics of different nozzles that includes curved conduit surfaces, according to different embodiments.
Figure 4:
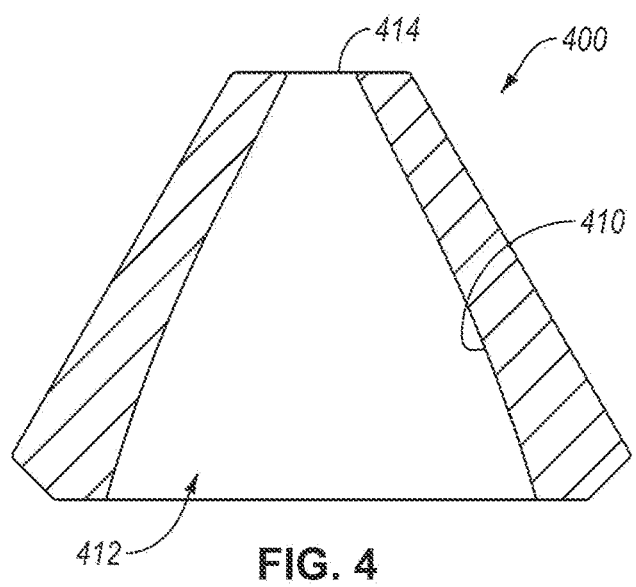

As previously discussed, the conduit surfaces disclosed herein may include a curved surface, such as a convex and concave curved surface. FIGS. 3 and 4 each show a cross-sectional view of different nozzle embodiments, each including curved conduit surfaces. Except as otherwise disclosed herein, the nozzles illustrated in FIGS. 3 and 4 may include one or more features which are the same or substantially similar to any of the one or more features of the nozzles disclosed herein, without limitation. For example, the nozzles may include a top surface, a bottom surface, a lateral surface, and a conduit surface defining a conduit.

Referring to FIG. 3, the nozzle 300 may include a conduit surface 310 exhibiting a convex curvature. The convex curvature of the conduit surface 310 may be configured to allow the conduit surface 310 to have only non-vertical surface(s) at a top portion of the conduit surface 310. As such, the conduit surface 310 may provide one or more of the following: decreasing the likelihood that the printing material clogs the conduit 312; decreasing the pressure required the push the printing material through the conduit 312; or decreasing the likelihood that strings of the printing material are formed while removing the printing material from the conduit 312 than if the conduit surface 310 included a vertical surface. In some embodiments, the lateral dimension at and near the opening 316 decreases at a greater rate than if the conduit surface 310 exhibited a truncated conical shape as shown in FIGS. 1B and 2. The greater change of the lateral dimension at and near the opening 316 may increase the force required to move the printing material through the conduit 312 near the opening 316 than if the conduit surface 310 exhibits a truncated conical shape.

Referring to FIG. 4, the nozzle 400 may include a conduit surface 410 exhibiting a concave curvature. The concave curvature of the conduit surface 410 may be configured to allow the conduit surface 410 to have only non-vertical surface(s) at a top portion of the conduit surface 410. As such, the conduit surface 410 may provide one or more of the following: decreasing the likelihood that the printing material clogs the conduit 412; decreasing the pressure required the push the printing material through the conduit 412; or decreasing the likelihood that strings of the printing material are formed while removing the printing material from the conduit 412 than if the conduit surface 410 included a vertical surface. In some embodiments, the lateral dimension at and near the orifice 414 decreases at a greater rate than if the conduit surface 410 exhibited a truncated conical shape as shown in FIGS. 1B and 2. The greater rate of change of the lateral dimension at and near the orifice 414 may increase the force required to move the printing material through the conduit 412 near the orifice 414 than if the conduit surface 410 exhibits a truncated conical shape.

During operation of any of the nozzles disclosed herein, the printing material may be heated to maintain the printing material in a fluid (e.g., flowable) state and to control the viscosity of the printing material. The printing material may be heated by heating the nozzle which, in turn, transfers heat to the printing material. It has been found that the effectiveness of the nozzle at heating the printing material flowing therethrough (e.g., minimizing a temperature gradient within the printing material) is dependent, at least in part, on the ratio of surface area of the nozzle (e.g., the surface area of the orifice and the conduit surface) that directly contacts the printing material relative to the volume of the conduit. In an example, increasing the surface area of the nozzle relative to the volume of the conduit may make heating of the printing material more effective (i.e., decrease a temperature that the nozzle needs to be heated and/or decrease a temperature gradient within the printing material). In an example, decreasing the surface area of the nozzle relative to the volume of the conduit may make heating of the printing material less effective. In such an example, the nozzle 100 may need to be heated to a higher temperature to ensure that all of the printing material exhibits at least a certain temperature.

Figure 5:
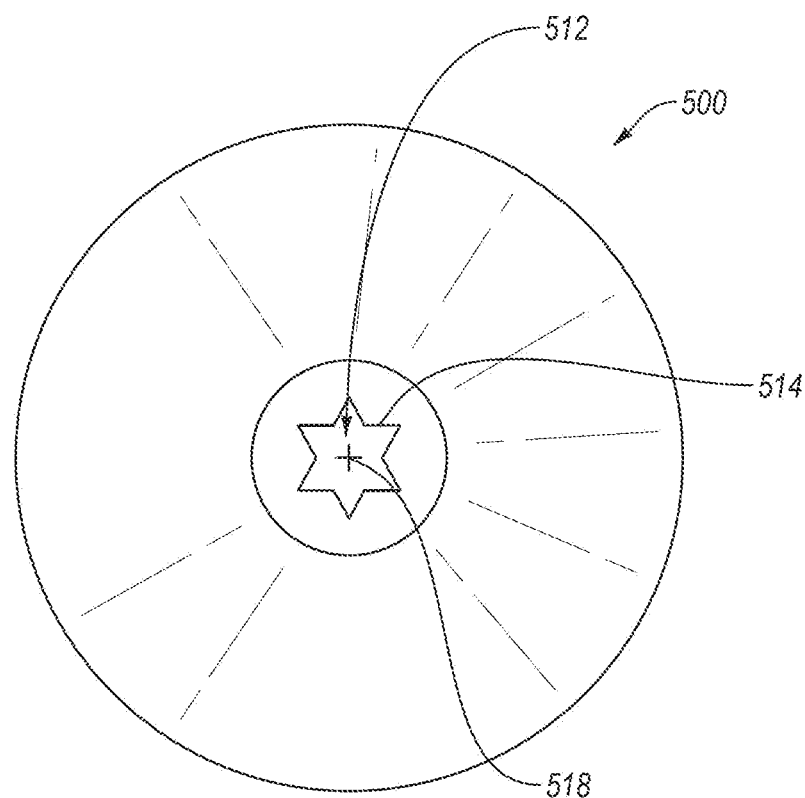
FIGS. 5 and 6 are top plan views of nozzles each having orifices exhibiting a non-circular cross-sectional shape, according to different embodiments.
Figure 6:
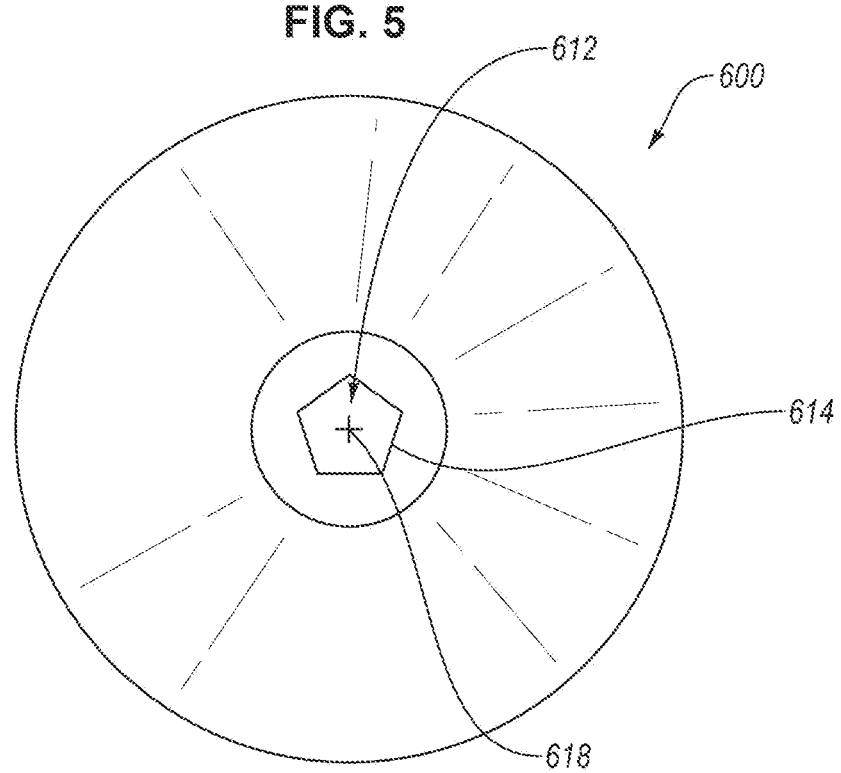

As shown in FIG. 1A, the orifice 114 may exhibit a generally circular shape at or near top surface 102. The conduit 112 of the nozzle 100 may also exhibit a generally circular shape when intersecting with a reference plane oriented perpendicularly to central axis 118 ("in-plane shape"), since forming the conduit 112 and the orifice 114 to exhibit the same general shape may facilitate manufacturing of the nozzle 100. A generally circular in-plane shape of the orifice 114 and the conduit 112 of the nozzle 100, relative to a non-circular in-plane shape, may decrease the surface area of the nozzle 100 that contacts the printing material relative to a volume of the conduit 112. As such, in some embodiments, the nozzles disclosed herein may include an orifice and/or conduit exhibiting a non-circular in-plane shape to increase the ratio of the surface area of the nozzle that contacts the printing material relative to the volume of the conduit. For example, FIGS. 5 and 6 are top plan views of a nozzle 500 and a nozzle 600, respectively, each having orifices exhibiting a non-circular in-plane shape, according to different embodiments. For example, the nozzle 500 is illustrated as having an orifice 514 exhibiting a generally 6-pointed star in-plane shape relative to a central axis 518 and the nozzle 600 is illustrated as having an orifice 614 exhibiting a generally pentagonal in-plane shape relative to a central axis 618. Although not shown, either of the conduit 512 of the nozzle 500 and the conduit 612 of the nozzle 600 may exhibit any non-circular in-plane shape, such as an in-plane shape that is substantially similar to the shape of the orifice thereof, respectively, to facilitate manufacturing. The non-circular in-plane shapes of orifices 514, 614 and conduits 512, 612 of nozzles 500, 600 may improve the effectiveness of the nozzles 500, 600 at heating the printing material flowing therethrough compared to the nozzle 100 illustrated in FIG. IA. It is noted that any of the orifices and/or conduits of any of the nozzles disclosed herein may exhibit any non-circular in-plane shape (other than a generally 6-pointed star in-plane shape or a generally pentagonal in-plane shape), without limitation, such as a generally oblong (e.g., elliptical) in-plane shape, a generally polygonal in-plane shape, a generally semi-circular in-plane shape, a generally triangular in-plane shape, a generally rectangular (e.g., square) in-plane shape, a generally hexagonal in-plane shape, a generally heptagonal in-plane shape, a generally octagonal in-plane shape, a generally 4-pointed star in-plane shape, a generally 5-pointed star shape, or any other suitable non-circular in-plane shape.

As previously discussed, the nozzles disclosed herein may include one or more chamfers extending from the top surface to at least one of the lateral surface or the conduit surface. FIGS. 7 and 8 are cross-sectional schematics of different nozzles that each include chamfers extending from the top surfaces thereof to the lateral surfaces or conduit surfaces thereof, according to different embodiments. Except as otherwise disclosed herein, the nozzles illustrated in FIGS. 7 and 8 may include one or more features which are the same or substantially similar to any of the features of other nozzle embodiments disclosed herein, without limitation.

Referring to FIG. 7, the nozzle 700 includes at least one outer chamfer 722 extending from the top surface 702 to the lateral surface 706. The outer chamfer 722 may prevent or at least decrease the likelihood that the nozzle 700 interferes with the printed material than if the nozzle 700 did not include the outer chamfer 722. For example, the top surface 702 of the nozzle 700 may not be oriented perfectly parallel to the printed material for a variety of reasons, such as the nozzle assembly that includes the nozzle 700 does not extend perfectly parallel to the printed material or variations in the thickness of the printed material. When a substantially similar nozzle that does not include the outer chamfer, a portion of the top surface thereof may end up closer to the printed material than the orifice thereof when the top surface of such a nozzle is not perfectly parallel to the printed material. The portion of the top surface that is closer to the printed material than the orifice is likely to contact or interfere with the printed material since the orifice of the nozzle may be configured to be positioned proximate to the printed material to improve the resolution of the printed material. Contacting the top surface of the nozzle against the printed material may at least one of deform (e.g., scrape or scratch) the printed material, remove or reduce one or more adhesion features formed on the printed material (e.g., a polished surface, one or more grooves, or one or more protrusions), or may pull the printed material in the direction that the nozzle moves (relative to the printed material). However, the outer chamfer 722 of the nozzle 700 decreases the maximum distance that the top surface 702 of the nozzle 700 may extend past the orifice 714 of the nozzle 700 when the top surface 702 is not perfectly parallel to the printed material. The decreased maximum distance that the top surface 702 extends past the orifice 714 may prevent or at least decrease the likelihood that the top surface 702 will contact or interfere with the printed material.

The outer chamfer 722 may exhibit a width $W_C$ measured perpendicular to a central axis 718 of the nozzle and a length $L_C$ measured parallel to the central axis 718. The width $W_C$ and the length $L_C$ may be independently selected to be about 0.05 mm or greater, about 0.075 mm or greater, about 0.1 mm or greater, about 0.125 mm or greater, about 0.15 mm or greater, about 0.2 mm or greater, about 0.25 mm or greater, about 0.3 mm or greater, about 0.4 mm or greater, about 0.5 mm or greater, about 0.6 mm or greater, about 0.7 mm or greater, about 0.8 mm or greater, about 0.9 mm or greater, about 1 mm or greater, or in ranges of about 0.05 mm to about 0.1 mm, about 0.075 mm to about 0.125 mm, about 0.1 mm to about 0.15 mm, about 0.125 mm to about 0.2 mm, about 0.15 mm to about 0.25 mm, about 0.2 mm to about 0.3 mm, about 0.25 mm to about 0.4 mm, about 0.3 mm to about 0.5 mm, about 0.4 mm to about 0.6 mm, about 0.5 mm to about 0.7 mm, about 0.6 mm to about 0.8 mm, about 0.7 mm to about 0.9 mm, or about 0.8 mm to about 1 mm.

The width $W_C$ and the length $L_C$ may be selected based on one or more factor. In an example, the width $W_C$ and the length $L_C$ may be selected based on the overall width and length of the nozzle 700 that are measured perpendicular of the width $W_C$ and the length $L_C$, respectively. In an example, the width $W_C$ and the length $L_C$ may be selected based on the angle(s) that the lateral surface 706 extends relative to the central axis 718 since such angle(s) may affect the angle that the outer chamfer 722 extends relative to the central axis 718. In an example, the width $W_C$ and the length $L_C$ may be selected based on the hardness of the nozzle 700 and, more particularly, how difficult the nozzle 700 is to shape, grind, or machine. For instance, the nozzle 700 may be formed from PCD, PcBN, or another superhard material that is difficult to shape, grind, or machine. As such, the width $W_C$ and the length $L_C$ may be selected to only be as large as necessary to avoid excessive manufacturing time, tooling, and/or associated costs.

The top surface 702 may exhibit a first surface area and the outer chamfer 722 may exhibit a second surface area. In an embodiment, the second surface area of the outer chamfer 722 may be selected to be significantly smaller (e.g., about 1% to about 10%, about 5% to about 15%, about 10% to about 20%, or about 15% to about 25) than the first surface area of the top surface 702 (e.g., to reduce machining of the nozzle 700). In an embodiment, the second surface area of the outer chamfer 722 may be selected to be comparable or greater (e.g., about 80% to about 100%, about 90% to about 120%, about 100% to about 150%, or greater than 150%) the first surface area of top surface 702. Such a configuration may significantly decrease the likelihood that the nozzle 700 contacts the printed material. In an embodiment, the second surface area of the outer chamfer 722 may be about 25% to about 80% the first surface area of top surface 702.

The nozzle 700 may include an inner chamfer 724 extending from the top surface 702 to the conduit surface 710. The inner chamfer 724 may increase the maximum lateral dimension (e.g., diameter) of the conduit 712 at the orifice 114. Increasing the maximum lateral dimension of the conduit 712 at the orifice 714 with the inner chamfer 724 may improve the consistency of the printed material dispensed from the nozzle 700 (e.g., reduce variations the lateral dimension(s) of the printing material) which may improve the resolution of the printed material. The inner chamfer 724 may exhibit a width and length measured perpendicularly and parallel to the central axis 718, respectively, that is within any of the ranges discussed above with respect to the width $W_C$ and $L_C$.

The outer and inner chamfers 722, 724 are illustrated as being generally conical surfaces. However, the nozzles disclosed herein may include inner and outer chamfers exhibiting generally curved, domed, convex, concave, ovoid, toroidal, or spheroidal surfaces. For example, referring to FIG. 8, the nozzle 800 includes an outer chamfer 822 extending from the top surface 802 to the lateral surface 806 and an inner chamfer 824 extending from the top surface 802 to the conduit surface 810. The outer and inner chamfers 822, 824 may exhibit one or more feature that is the same or substantially similar to one or more feature of outer or inner chamfers 722, 724 illustrated in FIG. 7, except that the outer and inner chamfer 822, 824 include convexly curved surfaces (when viewed in a cross-sectional view).

It is currently believed that a generally conical outer chamfer 722 may decrease the likelihood that the nozzle 700 contacts the printed material as compared to a curved or toroidal outer chamfer 822, since the slope of conical outer chamfer 722 is larger adjacent to the top surface 702 than the slope of the curved outer chamfer 822 adjacent to the top surface 802. It is currently believed that the curved inner chamfer 824 illustrated in FIG. 8 may improve the consistency of the printed material dispensed from the nozzle 800 compared to the conical inner chamfer 724 illustrated in FIG. 7, since the edge between the inner chamfer 724 and the conduit surface 710 is more pronounced when the inner chamfer is conical.

The nozzles 700 and 800 of FIGS. 7 and 8 are illustrated as including only conical or curved chamfers extending from the top surfaces thereof. However, it is noted that the nozzles disclosed herein may include a curved outer chamfer and a conical inner chamfer or a conical outer chamfer and curved inner chamfer. Further, it is noted that the nozzles disclosed herein may only include one or neither of the outer chamfer or the inner chamfer.

Figure 9A:
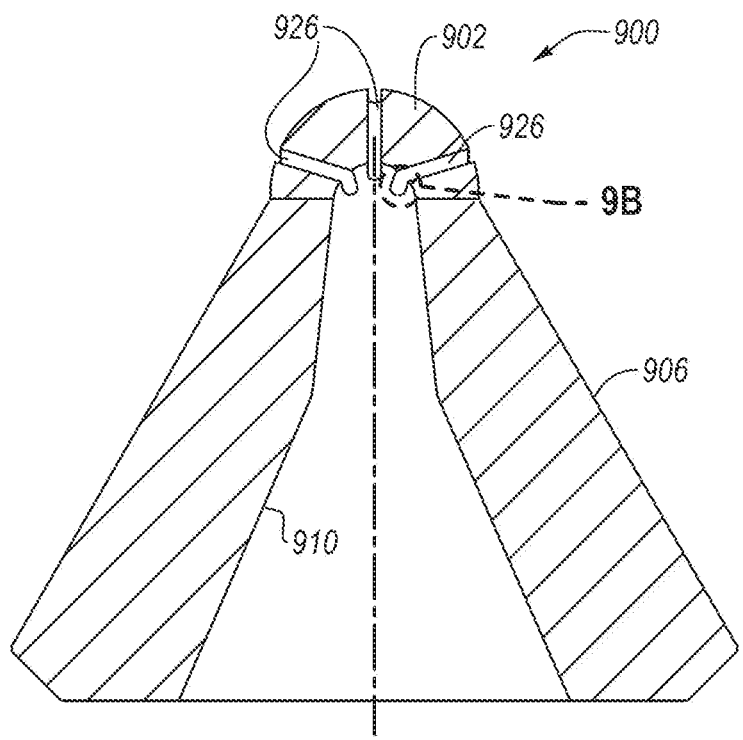
FIG. 9A is a cross-sectional schematic of a nozzle that is configured to increase the surface area of the printed material formed thereby, according to an embodiment.
Figure 10:
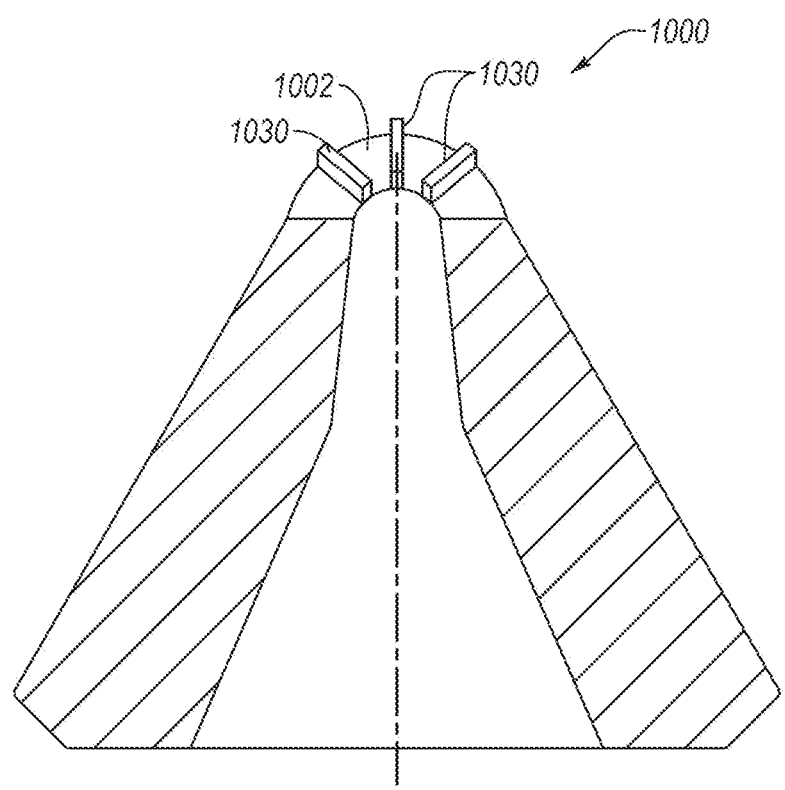
FIG. 10 is a cross-sectional schematic of a nozzle that is configured to increase the surface area of the printed material formed thereby, according to an embodiment.

As previously discussed, the nozzles disclosed herein may be configured to impart one or more adhesion enhancing features to the printed material formed using such nozzles. In an embodiment, as previously discussed, one or more polished surfaces of the nozzles may be configured to contact the printed material to impart a smooth surface to the printed material which may, in some circumstances, improve adhesion of a subsequent layer deposited thereon. In other embodiments, the nozzles disclosed herein may be configured to increase the surface area of the printed material formed thereby which may, in some circumstances, improve adhesion of a subsequent layer deposited thereon. FIGS. 9A and 10 are cross-sectional schematics of nozzles 900, 1000 that are configured to increase the surface area of the printed material formed thereby, according to different embodiments. Except as otherwise disclosed herein the nozzles 900, 1000 illustrated in FIGS. 9A and 10 are the same or substantially similar to any of the nozzles disclosed herein.

Referring to FIG. 9A, the nozzle 900 includes at least one top surface 902, at least one lateral surface 906, and at least one conduit surface 910. The nozzle 900 includes (e.g., defines) one or more passageways 926 extending inwardly from the top surface 902. The passageways 926 are configured to form one or more protrusions in the printed material, thereby increasing the surface area of the printed material which, as previously discussed, may enhance adhesion with the subsequent layer of printed material deposited thereon. The passageways 926 may form the protrusions in the printed material when at least one of the printed material brushes against the passageways 926 as being dispensed from the nozzle 900 or the top surface 902 may contact the printed material after the printed material is deposited.

The nozzle 900 may include any number of passageways 926 formed thereon. For example, the nozzle 900 may include 1, 2, 3, 4, 5, 6, 7, 8, 9, 10, or more than 10 passageways 926 formed thereon. The number of passageways 926 may affect at least one of the number of protrusions that are formed on the printed material, the size of the passageways 926 formed on the nozzle 900 which dictates the size of the protrusions formed on the printed material, or the number of directions that the nozzle 900 may move relative to the printed material.

In an embodiment, as shown, the passageways 926 may be radially extending passageways 926 that extend from the conduit surface 910 to the lateral surface 906. In such an embodiment, only the passageways 926 that extend substantially parallel to the direction that the nozzle 900 moves during operation may form protrusions in the printing material. In another embodiment (not shown), the passageway may include a plurality of substantially parallel passageways. In such an embodiment, the substantially parallel passageways may be oriented substantially parallel to the direction of relative movement between the nozzle 900 and the printed material during operation thereby allowing more protrusions to be formed in the printed material than if each of the passageways were radially extending passageways 926. In a further embodiment, the printing device to which the nozzle 900 is attached (e.g., via the base) may be configured to rotate the nozzle 900, such that the passageways may be oriented at a selected orientation relative to the anticipated direction of relative movement between the nozzle 900 and the printed material. Rotating the nozzle 900 may allow the one or more of the radially extending passageways 926 or the plurality of substantially parallel passageways (not shown) to be generally parallel to the anticipated direction of relative movement between the nozzle 900 and the printed material during operation. The printing device may be configured to rotate the nozzle 900 so that one or more of the passageways 926 are oriented generally parallel to the direction of movement between the nozzle 900 and the printed material.

Figures 9B, 9C:
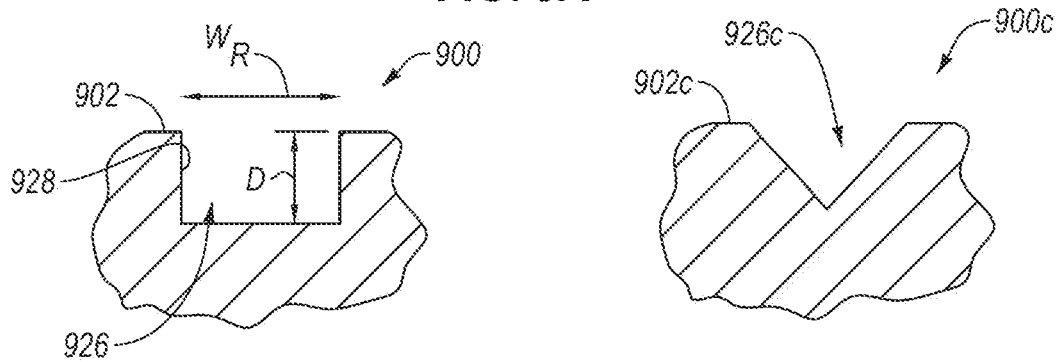
FIG. 9B is an enlarged cross-sectional schematic of a portion of the nozzle that includes a recesses taken from circle 9B illustrated in FIG. 9A, according to an embodiment.
FIGS. 9C and 9D are enlarged cross-sectional schematics of a portion of nozzles that includes recesses, according to different embodiments.

FIG. 9B is an enlarged cross-sectional schematic of a portion of the nozzle 900 that includes a passageways 926 taken from circle 9B illustrated in FIG. 9A, according to an embodiment. As shown in FIG. 9B, the passageway 926 may exhibit a width $W_R$ measured between opposition portions of the top surface 902 that define the passageway 926 and a maximum depth D measured perpendicular to the width $W_R$. The width $W_R$ and maximum depth D may be independently selected to be about 0.05 mm or greater, about 0.075 mm or greater, about 0.1 mm or greater, about 0.125 mm or greater, about 0.15 mm or greater, about 0.2 mm or greater, about 0.25 mm or greater, about 0.3 mm or greater, about 0.4 mm or greater, about 0.5 mm or greater, about 0.6 mm or greater, about 0.7 mm or greater, about 0.8 mm or greater, about 0.9 mm or greater, about 1 mm or greater, or in ranges of about 0.05 mm to about 0.1 mm, about 0.075 mm to about 0.125 mm, about 0.1 mm to about 0.15 mm, about 0.125 mm to about 0.2 mm, about 0.15 mm to about 0.25 mm, about 0.2 mm to about 0.3 mm, about 0.25 mm to about 0.4 mm, about 0.3 mm to about 0.5 mm, about 0.4 mm to about 0.6 mm, about 0.5 mm to about 0.7 mm, about 0.6 mm to about 0.8 mm, about 0.7 mm to about 0.9 mm, or about 0.8 mm to about 1 mm. The width $W_R$ and the depth D may be selected based on the desired size of the protrusions formed in the printed material since such protrusions may exhibit a size that corresponds to the size of the passageways 926. The desired size of the protrusions may be selected based on the material(s) that form the printed material. For example, one or more of the width $W_R$ or the depth D of the passageways 926 may be selected to increase the surface area of the protrusions which may be beneficial when the material(s) that form the printed material exhibit poor adhesion.

Figure 9D:
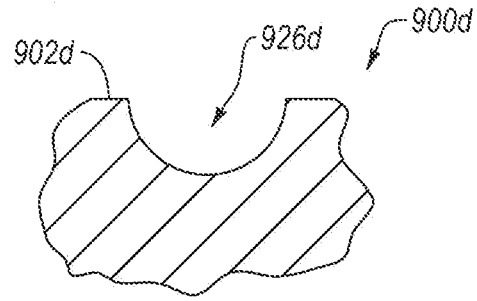

The passageway 926 may be defined by one or more passageway surfaces 928. In an example, the passageway 926 may exhibit a generally rectangular (e.g., square) cross-sectional shape. In such an example, the passageways surfaces 928 that define the passageway 926 may include two generally vertical passageways surfaces extending inwardly from the top surface 902 and a generally horizontal passageway surfaces extending between the vertical surfaces. It is noted that passageways formed in any of the nozzles disclosed herein may exhibit a non-rectangular cross-sectional shape. For example, FIGS. 9C and 9D are enlarged cross-sectional schematics of a portion of nozzles 900c, 900d that includes passageways 926c, 926d, respectively, according to different embodiments. Except as otherwise disclosed herein, one or more features of the nozzle 900c or nozzle 900d may be the same or substantially similar to one or more features of nozzle 900. As shown, the nozzle 900c includes a passageway 926c extending inwardly from a top surface 902c that exhibits a generally triangular cross-sectional shape and the nozzle 900d includes a passageway 926d extending inwardly from a top surface 902d that exhibits a generally semi-circular cross-sectional shape. The cross-sectional shape of the passageway may, for example, be selected based on the material(s) that form the printed material. For example, the different cross-sectional shapes of the passageways may affect the surface area of the printed material and/or certain cross-sectional shapes of the passageways may improve adhesion between the material(s) more so than other cross-sectional shapes.

Referring to FIG. 10, the nozzle 1000 includes one or more protrusions 1030 extending upwardly from the top surface 1002 thereof. Optionally, the protrusions 1030 may be configured to form one or more recesses in the printed material thereby increasing the surface area of the printed material which, as previously discussed, may enhance adhesion with the subsequent layer of printed material deposited thereon. For example, protrusions 1030 may form recesses in the printed material when at least one of the following occurs: 1) the printed material brushes against the protrusions 1030 as it is being dispensed from the nozzle 1000; or the top surface 1002 contacts the printed material after the printed material is deposited.

The protrusions 1030 may include one or more feature that is the same or substantially similar to one or more features of the passageways 926, except that the protrusions 1030 extend outwardly from the top surface 1002 instead of inwardly. In an example, the nozzle 1000 may include 1, 2, 3, 4, 5, 6, 7, 8, 9, 10, or more than 10 protrusions 1030 formed thereon. In an example, the protrusions 1030 may include a plurality of radially extending protrusions 1030 or a plurality of parallel protrusions 1030. In either embodiment, the printing device to which the nozzle 1000 is attached (e.g., via the base) may be configured to rotate the nozzle 1000. In an example, the protrusions 1030 may exhibit a width and maximum height that is independently selected from any of the ranges for the width $W_R$ and maximum depth D of the passageways 926 discussed above. The width and the maximum height of the protrusions 1030 may be selected based on the desired size of the recesses formed in the printed material since such recesses may exhibit a size the corresponds to the size of the protrusions 1030. In an example, the protrusions 1030 may exhibit a generally rectangular (e.g., square) cross-sectional shape, a generally triangular cross-sectional shape, a generally semicircular cross-sectional shape, or any other suitable cross-sectional shape. The cross-sectional shape of the protrusions 1030 may be selected based on the material(s) that form the printed material since the different cross-sectional shapes of the protrusions 1030 may affect the surface area of the printed material and/or certain cross-sectional shapes of the protrusions may improve adhesion between the material(s) more than other cross-sectional shapes.

Figure 11:
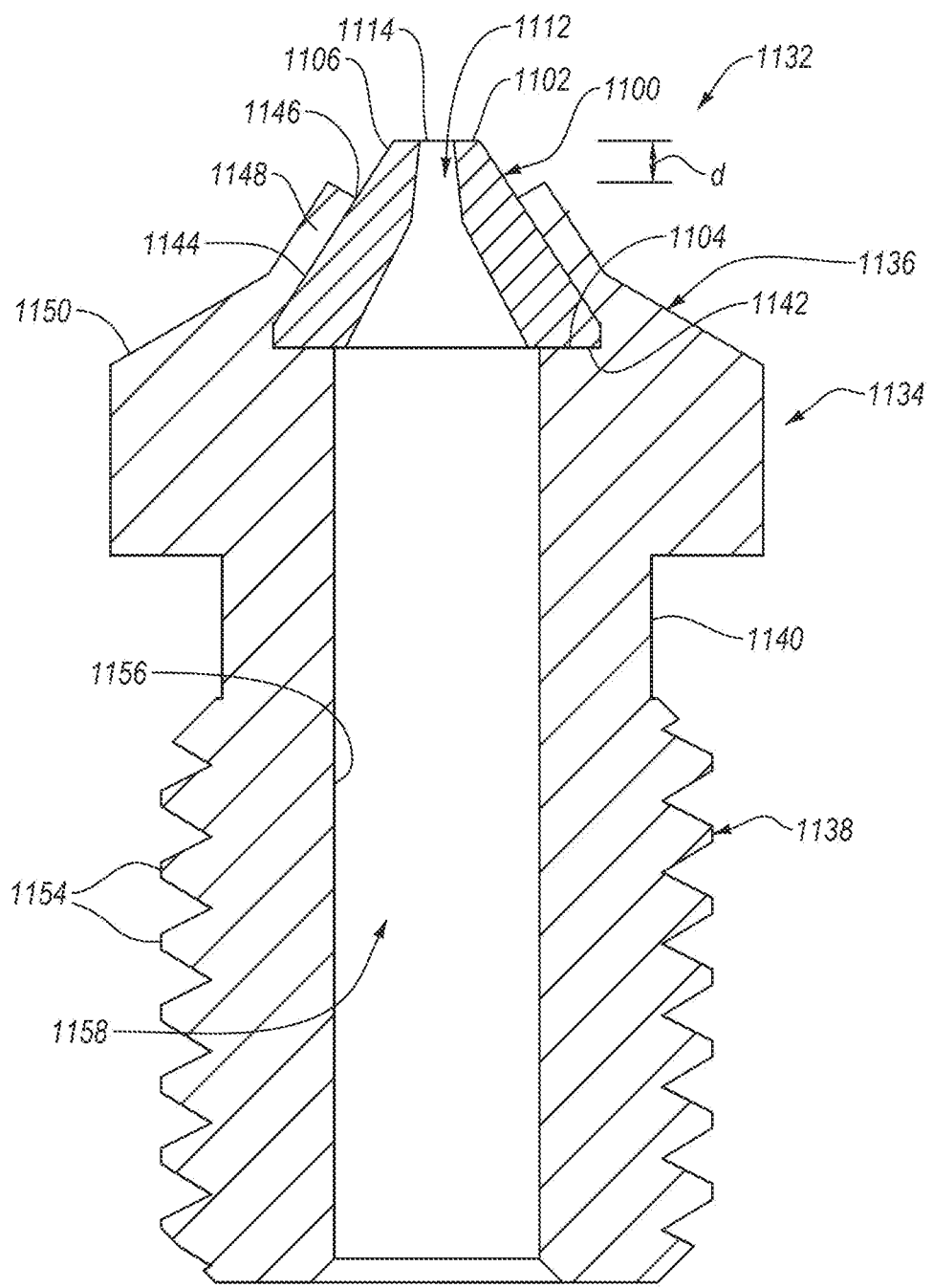
FIG. 11 is a cross-sectional schematic of a nozzle assembly including a nozzle attached to a base, according to an embodiment.

As previously discussed, the nozzles disclosed herein may be attached to a base to form a nozzle assembly that is configured to be attached to a printing device. FIG. 11 is a cross-sectional schematic of a nozzle assembly 1132 including a nozzle 1100 attached to a base 1134, according to an embodiment. Except as otherwise disclosed herein, the nozzle 1100 may include one or more feature that is the same or substantially similar to one or more feature of any of the nozzles disclosed herein, without limitation.

The base 1134 includes a nozzle portion 1136 that is configured to have the nozzle 1100 attached thereto and an attachment portion 1138 that is configured to attach the base 1134 to a printing device (not shown). The base 1134 may optionally include an intermediate portion 1140 between the nozzle portion 1136 and the attachment portion 1138.

The nozzle portion 1136 of the base 1134 defines a recess (not labeled, occupied by nozzle 1100) that is configured to receive the nozzle 1100. The recess is partially defined by a base contact surface 1142 that is configured to abut the bottom surface 1104 of the nozzle 1100. The base contact surface 1142 may exhibit a surface topography that generally corresponds to the surface topography of the bottom surface 1104 of the nozzle 1100. The corresponding surface topographies of the base contact surface 1142 and the bottom surface 1104 may be configured to prevent or at least inhibit leakage of a printing material between the nozzle 1100 and the base 1134. The recess is also partially defined by at least one recess lateral surface 1144. The recess lateral surface 1144 may define a recess opening 1146 that allows the orifice 1114 of the nozzle 1100 to be exposed (e.g., not covered by the base 1134) and may allow a portion of the nozzle 1100 to extend beyond an end surface of the base 1134. In other words, the recess lateral surface 1144 may be configured to not abut or cover at least a portion (e.g., all) of the top surface 1102 of the nozzle 1100. The recess lateral surface 1144 may exhibit a shape that corresponds to the shape of the lateral surface 1106 of the nozzle 1100 thereby preventing or at least inhibiting the printing material from leaking between the recess lateral surface 1144 and the lateral surface 1106 of the nozzle 1100. The recess may optionally include at least one chamfer surface (not shown) extending between the base contact surface 1142 and the recess lateral surface 1144 sized and configured to abut an optional chamfer (not shown) of the nozzle 1100 extending between the bottom surface 1104 and the lateral surface 1106 of the nozzle 1100.

The nozzle portion 1136 may include at least one wall 1148 extending from the rest of the nozzle portion 1136 (e.g., a tapered surface 1150 or gripping feature). The wall 1148 forms at least a portion of the recess lateral surface 1144. In one embodiment, the wall 1148 may be configured to allow the base 1134 to secure the nozzle 1100 thereto via swaging. For example, the wall 1148 may be initially vertical or otherwise oriented (not shown) such that the lateral dimension the recess opening 1146 is wide enough for the nozzle 1100 to be correctly positioned in the recess (e.g., the bottom surface 1104 of the nozzle 1100 abuts the base contact surface 1142). The wall 1148 may be configured to be deformed inwardly thereby reducing a lateral dimension of the recess opening 1146 such that the lateral dimension of the recess opening 1146 is not wide enough for the nozzle 1100 to pass through the recess opening 1146. Thus, deformation of the wall 1148 inwardly may secure and/or position the nozzle 1100 to the base 1134. The wall 1148 may also be deformed inwardly such that the recess lateral surface 1144 abuts the lateral surface 1106 of the nozzle 1100.

The nozzle portion 1136 may include a tapered surface 1150 extending outwardly from the recess opening 1146 and/or the wall 1148. The tapered surface 1150 may include one or more planar surfaces and/or rounded surfaces. As shown in FIG. 11, the tapered surface 1150 is not perpendicular to a longitudinal axis (e.g., with respect to a central axis, not shown) of the base 1134 and instead is angled and/or curved towards the attachment portion 1138 of the base 1134. The tapered surface 1150 may prevent or at least decrease the likelihood that the base 1134 contacts the printed material than if the base 1134 included a non-tapered surface.

The nozzle portion 1136 may include one or more gripping features that are configured to facilitate attachment and detachment of the base 1134 to a printing device. In an embodiment, as described below, the nozzle portion 1136 may be configured to be threadedly attached to a printing device (not shown) and may include "wrench flats", which are sized and configured to allow a wrench to rotate the nozzle assembly. In some embodiments, the gripping features may include a generally square, hexagonal (as shown), other suitable wrench flat shape, or other suitable shape that allows a portion of the nozzle portion 1136 to be gripped and twisted with fingers, pliers, wretches, sockets, or other tools. In some embodiments, the gripping features may include one or more textured surfaces (cylindrical, wrench flat, or other suitable shape) or a high friction material that also allows the nozzle portion 1136 to be gripped with fingers, pliers, or other tools.

As previously discussed, the base 1134 includes an attachment portion 1138. The attachment portion 1138 is configured to attach the base 1134 to the printing device. In an embodiment, as illustrated, the attachment portion 1138 is configured to be threadedly attached to the printing device. In such an embodiment, the attachment portion 1138 may define one or more helically extending threads 1154. In an embodiment, the attachment portion 1138 may include a magnet, a recess configured to receive a pin, be configured to be press-fitted to the printing device, brazed, soldered, adhesively attached, or attached to the printing device using any other suitable technique. In an embodiment, the base 1134 may be configured to be selectively attached to a printing device and removed from such printing device, respectively. In such an embodiment, the base 1134 may be attached and detached from the printing device substantially without damaging the base 1134 or the printing device. Selectively attaching the base 1134 to the printing device allows the printing device to be used with a variety of nozzle assemblies (e.g., nozzle assemblies with different sized orifices) or to replace worn nozzle assemblies. In an embodiment, the base 1134 may be configured to be selectively attached to the base 1134.

The base 1134 includes at least one passageway surface 1156 that defines a passageway 1158. The passageway 1158 is configured to extend from the conduit (e.g., an opening of the conduit) of the nozzle 1100 to an exterior of the base. The passageway 1158 may be in fluid communication a printing material source (e.g., another conduit or tank) of the printing device when the base 1134 is attached to the printing device. As such, the printing material from the printing material source may flow from the printing material source, through the passageway 1158, and to the conduit 1112 of the nozzle 1100. In an embodiment, the passageway 1158 is centrally located in the base 1134 and extends from the base contact surface 1142 to an opposing surface of the attachment portion 1138. However, it is noted that the passageway 1158 may not exhibit one or more of the following: be centrally located, extend from the base contact surface, or extend to the opposing surface of the attachment portion 1138 (e.g., depending on the location of the printing material source and/or the location of the opening of the conduit of the nozzle 1100).

As previously discussed, the nozzle 1100 may be secured to the base 1134 via swaging or via other suitable deformation of base 1134 to accomplish retention of nozzle 1100. However, the nozzle 1100 may be secured to the base 1134 using one or more other techniques, such as brazing, soldering, adhesive attachment, press-fitting, threadedly attaching, or otherwise attaching the nozzle 1100 to the base 1134. Depending on the one or more method used to attach the nozzle 1100 to the base 1134, the recess may be omitted from the base 1134 and the nozzle 1100 may merely be attached to an exterior surface of the base 1134. Further examples of attaching the nozzle 1100 to the base 1134 are disclosed in U.S. Provisional Patent Application No. 63/171,708, filed on Apr. 7, 2021, the disclosure of which is incorporated herein, in its entirety, by this reference. It is noted that, when the nozzle 1100 includes PCD, the one or more method used to attach the nozzle 1100 to the base 1134 may be selected to include one or more non-thermal attachment technique (i.e., an attachment technique that requires heating the nozzle 1100) or an attachment technique that heats the nozzle 1100 to a temperature of at most 700° C., since PCD may begin to degrade when exposed to temperatures greater than 700° C.

As previously discussed, the top surface 1102 of the nozzle 1100 may extend a distance d above the base 1134. Extending the top surface 1102 above the base 1134 decreases the likelihood that the base 1134 contacts the printed material thereby smearing, displacing, or otherwise adversely affecting the printed material. In an embodiment, the distance d may be selected to be greater than about 0.1 mm, greater than about 0.5 mm, greater than about 1 mm, greater than about 1.5 mm, greater than about 2 mm, greater than about 2.5 mm, greater than about 3 mm, greater than about 3.5 mm, greater than about 4 mm, greater than about 5 mm, or in ranges of about 0.1 mm to about 0.5 mm, about 0.25 mm to about 0.75 mm, about 0.5 mm to about 1 mm, about 0.75 mm to about 1.25 mm, about 1 mm to about 1.5 mm, about 1.25 mm to about 1.75 mm, about 1.5 mm to about 2 mm, about 1.75 mm to about 2.25 mm, about 2 mm to about 2.5 mm, about 2.25 mm to about 2.75 mm, about 2.5 mm to about 3 mm, about 2.75 mm to about 3.25 mm, about 3 mm to about 3.5 mm, about 3.25 mm to about 3.75 mm, about 3.5 mm to about 4 mm, about 3.75 mm to about 4.5 mm, or about 4 mm to about 5 mm. In an embodiment, the ratio of the distance d to the maximum length of the nozzle 1100, calculated using the equation d/(maximum length), is about 0.1 to about 0.3, about 0.2 to about 0.4, about 0.3 to about 0.5, about 0.4 to about 0.6, about 0.5 to about 0.7, about 0.6 to about 0.8, or about 0.7 to about 0.9. The distance d and the ratio of the distance d to the maximum length may be selected based on the maximum length of the nozzle 1100, the percentage of the lateral surface 1106 that is non-vertical, the angle of the non-vertical portions of the nozzle 1100 relative to a central axis of the nozzle 1100, and the desired resolution of the printed material.

As previously discussed, the nozzle 1100 may be heated during operation to control the temperature of the printing material (e.g., maintain the printing material in a fluid state and/or control the viscosity of the printing material). Generally, heating the nozzle 1100 includes heating the base 1134 with the printing device, transferring the heat into the base 1134 to the nozzle 1100, and transferring the heat into the nozzle 1100 to the printing material. The thermal conductivity of the nozzle 1100 and the base 1134 affects how effectively and consistently the printing material is heated. For example, decreasing the thermal conductivity of the nozzle 1100 and the base 1134 causes portions of the nozzle 1100 and the base 1134 closest to the heater of the printing device to exhibit a higher temperature than portions of the nozzle 1100 and the base 1134 that are spaced from the heating device. This temperature gradient causes the printing material to be heated to different temperatures depending on which portion of the nozzle assembly 1132 the printing material is flowing through. The different temperatures may cause portions of the printing material to be heated to too low of temperatures to maintain the printing material in a fluid state or maintain the viscosity thereof and/or may require portions of the printing material to be heated to too high of temperatures (which may cause burning of the printing material). As such, it is beneficial to select the materials of the nozzle 1100 and the base 1134 to increase the thermal conductivity thereof to reduce any temperature gradients thereof.

In an embodiment, the nozzle 1100 may be formed from PCD or PcBN, materials which exhibit exceptionally high thermal conductivities and wear resistance. In such an embodiment, the base 1134 may be formed from a material exhibiting a thermal conductivity that is less than PCD and PcBN, such as brass or steel. The volume of the nozzle 1100 may be increased to mitigate the effect of the lower thermal conductivity of the base 1134. For example, at least some conventional superhard nozzles exhibit a volume of about 6.5 $mm^3$ or less. The nozzle 1100 (and any of the nozzles disclosed herein) may exhibit a volume that is about 7.5 $mm^3$ or greater, about 8 $mm^3$ or greater, about 9 $mm^3$ or greater, about 10 $mm^3$ or greater, about 11 $mm^3$ or greater, about 12 $mm^3$ or greater, about 13 $mm^3$ or greater, about 15 $mm^3$ or greater, about 17.5 $mm^3$ or greater, about 20 $mm^3$ or greater, about 22.5 $mm^3$ or greater, about 25 $mm^3$ or greater, about 30 $mm^3$ or greater, about 35 $mm^3$ or greater, about 40 $mm^3$ or greater, about 40 $mm^3$ or greater, about 45 $mm^3$ or greater, about 50 $mm^3$ or greater, about 60 $mm^3$ or greater, about 70 $mm^3$ or greater, about 80 $mm^3$ or greater, about 90 $mm^3$ or greater, about 100 $mm^3$ or greater, about 250 $mm^3$ or greater, about 500 $mm^3$ or greater, about 750 $mm^3$ or greater, about 1,000 $mm^3$ or greater, about 2,500 $mm^3$ or greater, about 5,000 $mm^3$ or greater, about 7,500 $mm^3$ or greater, or in ranges of about 7.5 $mm^3$ to about 9 $mm^3$, about 8 $mm^3$ to about 10 $mm^3$, about 9 $mm^3$ to about 11 $mm^3$, about 10 $mm^3$ to about 12 $mm^3$, about 11 $mm^3$ to about 13 $mm^3$, about 12 $mm^3$ to about 14 $mm^3$, about 13 $mm^3$ to about 15 $mm^3$, about 14 $mm^3$ to about 17.5 $mm^3$, about 15 $mm^3$ to about 20 $mm^3$, about 17.5 $mm^3$ to about 22.5 $mm^3$, about 20 $mm^3$ to about 25 $mm^3$, about 22.5 $mm^3$ to about 30 $mm^3$, about 25 $mm^3$ to about 35 $mm^3$, about 30 $mm^3$ to about 40 $mm^3$, about 35 $mm^3$ to about 45 $mm^3$, about 40 $mm^3$ to about 50 $mm^3$, about 45 $mm^3$ to about 60 $mm^3$, about 50 $mm^3$ to about 70 $mm^3$, about 60 $mm^3$ to about 80 $mm^3$, about 70 $mm^3$ to about 90 $mm^3$, about 80 $mm^3$ to about 100 mm³, about 90 mm³ to about 250 mm³, about 100 mm³ to about 500 mm³, about 250 mm³ to about 750 mm³, about 500 mm³ to about 1,000 mm³, about 750 mm³ to about 2,500 mm³, about 1,000 mm³ to about 5,000 mm³, or about 2,500 mm³ to about 7,500 mm³.

Figures 12, 13:
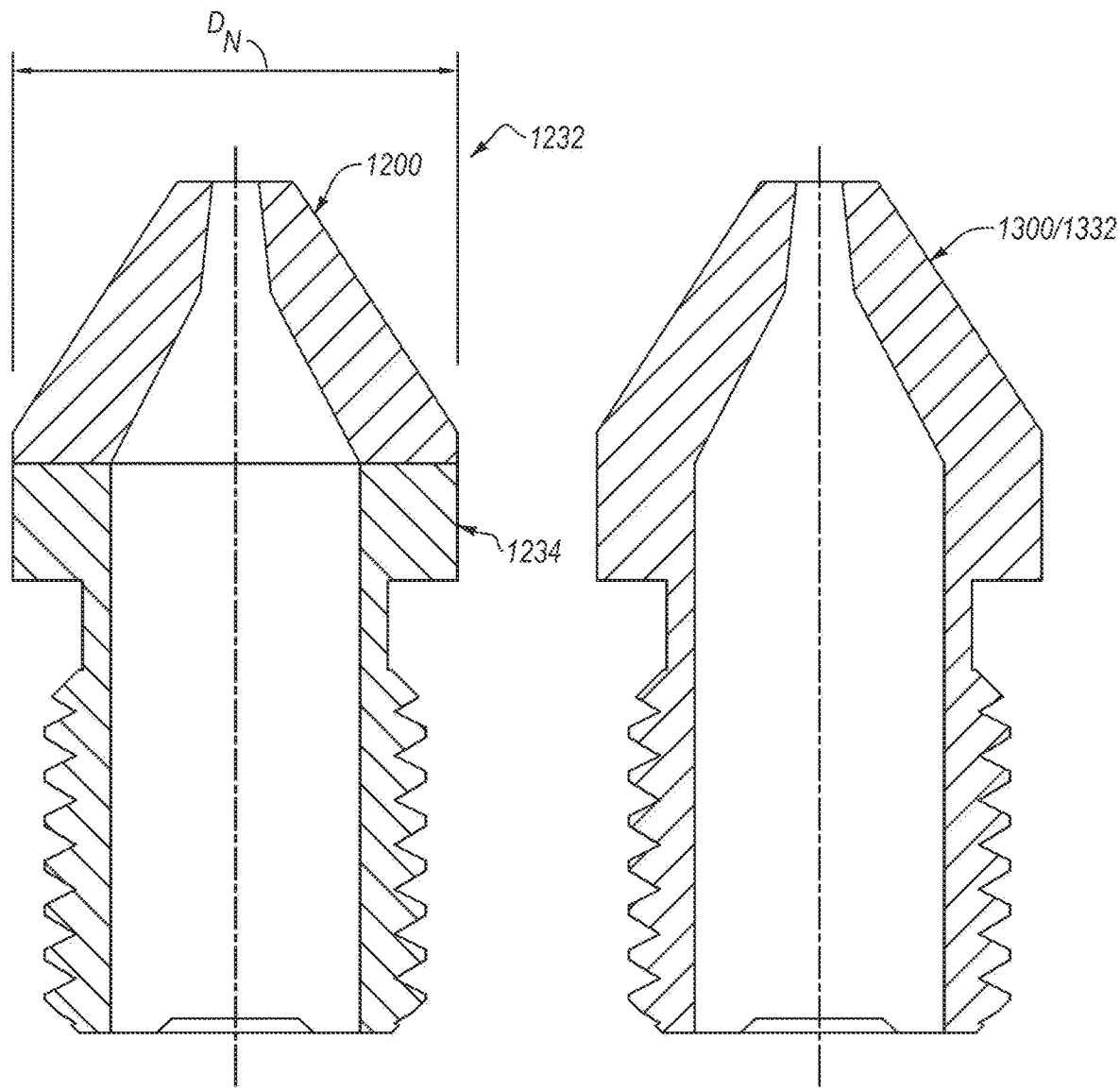
FIG. 12 is a cross-sectional schematic of a nozzle assembly that includes a nozzle attached to a base where the maximum lateral dimension is equal to or greater than the maximum lateral dimension of the base, according to an embodiment.
FIG. 13 is a cross-sectional schematic of a nozzle assembly that includes a nozzle and does not include a base, according to an embodiment.

In an embodiment, the nozzle 1100 may exhibit a maximum lateral dimension $D_N$ that is less than a maximum lateral dimension $D_B$ of the base 1134 which may facilitate attaching the nozzle 1100 to the base 1134 using swaging or the recess defined by the base 1134. However, in such an embodiment, the smaller maximum lateral dimension $D_N$ of the nozzle 1100 limits the volume that the nozzle 1100 exhibits. In other words, the smaller maximum lateral dimension $D_N$ of the nozzle 1100 may reduce the effect of the high thermal conductivity of the nozzle 1100 when the nozzle 1100 is formed from PCD or PcBN. In an embodiment, the nozzles disclosed herein may exhibit a maximum lateral dimension that is equal to or greater than the maximum lateral dimension of the base to which the nozzle is attached. In such an embodiment, the nozzles exhibiting a maximum lateral dimension that is equal to or greater than the maximum lateral dimension of the base to which the nozzle is attached allows the volume of the nozzle to be increased. For example, FIG. 12 is a cross-sectional schematic of nozzle assembly 1232 that includes a nozzle 1200 attached to a base 1234 where the maximum lateral dimension $D_N$ is equal to or greater than the maximum lateral dimension $D_B$ of the base 1234, according to an embodiment. Except as otherwise disclosed herein, one or more features of the nozzle 1200 or the base 1234 may be the same or substantially similar to one or more features any of the nozzles and bases disclosed herein, respectively.

The maximum lateral dimension $D_N$ of the nozzle 1200 may hinder or complicate the nozzle attachment to the base 1234 using certain attachment techniques (e.g., swaging) and/or using a recess. Instead, in an embodiment, the nozzle 1200 may be brazed, soldered, adhesively attached, or otherwise attached to the base 1234 using any suitable technique. In an embodiment, the nozzle 1200 may include a protrusion extending from a bottom surface thereof that is configured to be positioned in a recess defined by the base 1234. Examples of protrusions extending from a bottom surface of a PCD body are disclosed in U.S. Provisional Patent Application No. 63/154,277, filed Feb. 26, 2021, the disclosure of which is incorporated herein, in its entirety, by this reference.

The nozzle 1200 may exhibit any of the volumes discussed above with regards to the nozzle 1100 illustrated in FIG. 11. However, it is noted that the nozzle 1200 may exhibit a volume that is about 150 mm³ or greater, about 200 mm³ or greater, about 300 mm³ or greater, about 400 mm³ or greater, about 500 mm³ or greater, about 750 mm³ or greater, about 1 cm³ or greater, about 1.25 cm³ or greater, about 1.5 cm³ or greater, about 1.75 cm³ or greater, about 2 cm³ or greater, about 2.25 cm³ or greater, about 2.5 cm³ or greater, about 3 cm³ or greater, about 4 cm³ or greater, about 5 cm³ or greater, or in ranges of about 100 mm³ to about 200 mm³, about 150 mm³ to about 300 mm³, about 200 mm³ to about 400 mm³, about 300 mm³ to about 500 mm³, about 400 mm³ to about 750 mm³, about 500 mm³ to about 1 cm³, about 750 mm³ to about 1.25 cm³, about 1 cm³ to about 1.5 cm³, about 1.25 cm³ to about 1.75 cm³, about 1.5 cm³ to about 2 cm³, about 1.75 cm³ to about 2.5 cm³, about 2 cm³ to about 3 cm³, about 2.5 cm³ to about 4 cm³, or about 3 cm³ to about 5 cm³.

In some embodiments, the nozzles disclosed herein may form an entirety of the nozzle assembly. For example, FIG. 13 is a cross-sectional schematic of a nozzle assembly 1332 that includes a nozzle 1300 and does not include a base, according to an embodiment. Since the nozzle 1300 forms an entirety (or a majority or substantially the entirety) of the nozzle assembly 1332, the thermal conductivity of the nozzle 1300 may control the heating of the printing material. In such a configuration, nozzle 1300 may comprise one or more superhard material, without limitation. In one embodiment, when the nozzle 1300 is formed from PCD or PcBN, the high thermal conductivity of such materials may cause at least a portion of the nozzle 1300 to be heated to substantially the same temperature (e.g., any temperature gradient in the nozzle 1300 may be less than 1° C., less than 2° C., or less than 5° C.). It is noted that superhard materials (e.g., PCD, silicon carbide, or PcBN) may include manufacturing size limitations. As such, the volume and dimensions of the nozzle 1300 may be limited by the manufacturing size limitations of superhard material. Accordingly, in some embodiments, the nozzle 1300 may be formed by brazing, metallurgically bonding, or otherwise attaching a plurality of superhard bodies (e.g., PCD and/or PcBN bodies) together to form the nozzle 1300 thereby allowing the nozzle 1300 to exhibit at least one of a volume or dimensions that are greater than the manufacturing limits of certain superhard material.

Figure 14:
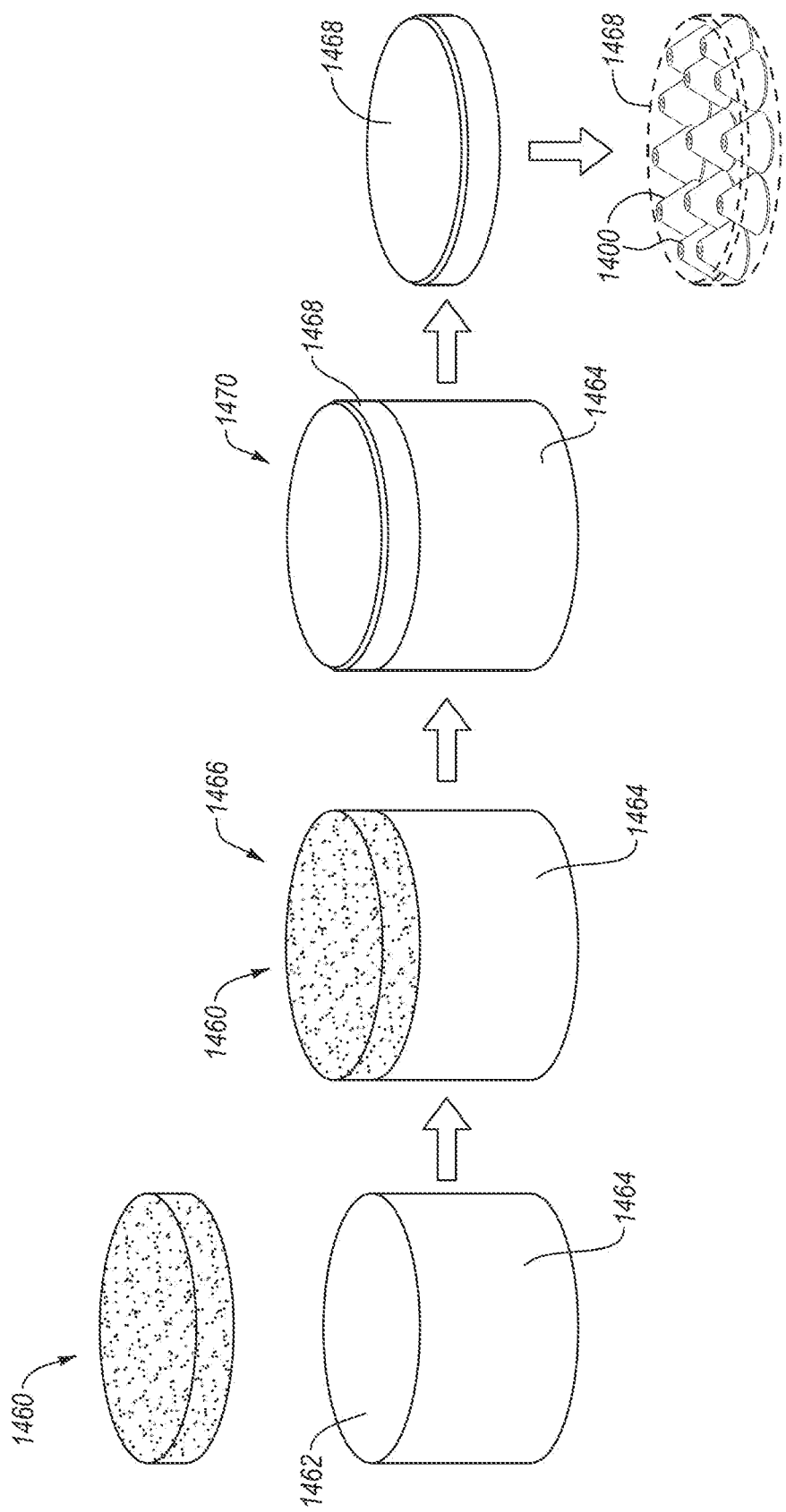
FIG. 14 is a schematic illustration of an embodiment of a method for fabricating a nozzle from polycrystalline diamond, according to an embodiment.

As previously discussed, any of the nozzles disclosed herein may be formed from PCD. FIG. 14 is a schematic illustration of an embodiment of a method for fabricating a nozzle 1400 from PCD, according to an embodiment. It is noted that the nozzle 1400 may be any of the nozzles disclosed herein. Referring to FIG. 14, a mass of diamond particles 1460 is provided. The diamond particles 1460 may exhibit an average particle size of about 50 μm or less, such as about 40 μm or less, about 30 μm or less, about 20 μm or less, about 10 μm to about 18 μm, or about 15 μm to about 18 μm. In some embodiments, the average particle size of the diamond particles 1460 may be about 10 μm or less, such as about 2 μm to about 5 μm or submicron. The average particle size of the diamond particles 1460 may be selected to minimize volume loss of the nozzle formed thereby. For example, it has been found that the printing material flowing through the conduit of the nozzle may cause some of the diamond grains to become dislodged thereby resulting in volume loss (i.e., wear) of the nozzle. To minimize volume loss, the diamond particles 1460 may be selected to exhibit an average particle size that is less than 40 μm such that dislodging one or a few diamond grains has negligible effect on the volume of the nozzle. However, it is noted that decreasing the average particle size of the diamond particles 1460 may further limit volume loss and, as such, the diamond particles 1460 may be selected to exhibit an average particle size that is significantly less than 40 μm, such as less than 20 μm or less than 10 μm.

In an embodiment, the diamond particles 1460 may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the mass of diamond particles 1460 may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In one embodiment, the mass of diamond particles 1460 may include a portion exhibiting a relatively larger size between about 10 μm and about 40 μm and another portion exhibiting a relatively smaller size between about 1 µm and 4 µm. In some embodiments, the mass of diamond particles 1460 may comprise three or more different sizes (e.g., one relatively larger size and two or more relatively smaller sizes), without limitation. It is noted that the as-sintered diamond grain size may differ from the average particle size of the mass of diamond particles prior to sintering due to a variety of different physical processes, such as grain growth, diamond particles fracturing, carbon provided from another carbon source (e.g., dissolved carbon in the metal-solvent catalyst), or combinations of the foregoing.

The mass of diamond particles 1460 is positioned adjacent to the interfacial surface 1462 of the substrate 1464 to form an assembly 1466. The substrate 1464 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in one embodiment, the substrate 1464 comprises cobalt-cemented tungsten carbide. The substrate 1464 may be generally cylindrical or another 1462 configuration, without limitation. Although FIG. 14 shows an interfacial surface 1462 of the substrate 1464 as being substantially planar, the interfacial surface 1462 may exhibit a selected nonplanar topography, such as a grooved, ridged, or other nonplanar interfacial surface.

The assembly 1466 also includes a catalyst configured to sinter the mass of diamond particles 1460. The catalyst may be provided in particulate form mixed with the mass of diamond particles 1460, as a thin foil or plate placed adjacent to the mass of diamond particles 1460, from the substrate 1464 (e.g., the substrate 1464 is a cemented carbide substrate including a metal-solvent catalyst), or combinations thereof. In an embodiment, the catalyst includes a metal-solvent catalyst (e.g., iron, nickel, cobalt, or alloys thereof). In an embodiment, the catalyst includes at least one nonmetallic catalyst selected from one or more of alkali metal carbonate (e.g., one or more carbonates of Li, Na, and K), one or more alkaline earth metal carbonates (e.g., one or more carbonates of Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, a chloride (e.g., one or more chlorides of Li, Na, and K), elemental sulfur and/or a derivative thereof, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a geranium alloy), and combinations of the foregoing. In an example, the catalyst includes one or more metal-solvent catalysts and one or more nonmetallic catalysts.

In order to efficiently sinter the mass of diamond particles 1460, the assembly 1466 may be enclosed in a pressure transmitting medium, such as a refractory metal can, graphite structure, pyrophyllite, and/or other suitable pressure transmitting structure to form a cell assembly. Examples of suitable gasket materials and cell structures for use in manufacturing PCD are disclosed in U.S. Pat. Nos. 6,338, 754 and 8,236,074, each of which is incorporated herein, in its entirety, by this reference. Another example of a suitable pressure transmitting material is pyrophyllite, which is commercially available from Wonderstone Ltd. of South Africa.

The cell assembly 1466, including the pressure transmitting medium and mass of diamond particles 1460 therein, is subjected to an HPHT process using an ultra-high pressure press at a temperature of at least about 1000° C. (e.g., about 1100° C. to about 2200° C., or about 1200° C. to about 1450° C.) and a pressure in the pressure transmitting medium of at least about 5 GPa (e.g., about 7.5 GPa to about 15 GPa, at least about 8.0 GPa, at least about 9.0 GPa, at least about 10.0 GPa, at least about 11.0 GPa, at least about 12.0 GPa, or at least about 14 GP) for a time sufficient to sinter the diamond particles 1460 together in the presence of the catalyst and form the PCD table 1468 comprising bonded diamond grains defining interstitial regions occupied by the catalyst. The HPHT process may form a PCD compact 1470 that includes the PCD table 1468 bonded to the substrate during the HPHT process, the catalyst may liquefy and, if the catalyst is disposed outside the diamond particles 1460, the catalyst may infiltrate the mass of diamond particles 1460. The catalyst promotes growth between adjacent diamond particles of the mass of diamond particles 1460 to form the PCD table 1468 comprised of a body of bonded diamond grains having the infiltrated catalyst interstitially disposed between bonded diamond grains. For example, if the substrate 1464 is a cobalt-cemented tungsten carbide substrate, cobalt from the substrate 1464 may be liquefied and infiltrate the mass of diamond particles 1460 to catalyze formation of the PCD table 1468.

The pressure values employed in the HPHT processes disclosed herein refer to the pressure in the pressure transmitting medium at room temperature (e.g., about 25° C.) with application of pressure using an ultra-high pressure press and not the pressure applied to exterior of the cell assembly 1466. The actual pressure in the pressure transmitting medium at sintering temperature may be slightly higher. The ultra-high pressure press may be calibrated at room temperature by embedding at least one calibration material that changes structure at a known pressure, such as PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

In other embodiments, a PCD table 1468 according to an embodiment may be separately formed using an HPHT sintering process and, subsequently, bonded to the interfacial surface 1462 of the substrate 1464 by brazing, using a separate HPHT bonding process, or any other suitable joining technique, without limitation. In yet another embodiment, a substrate 1464 may be formed by depositing a binderless carbide (e.g., tungsten carbide) via chemical vapor deposition onto the separately formed PCD table 1468.

In any of the embodiments disclosed herein, substantially all or a selected portion of the catalyst (e.g., metal-solvent catalyst) may be removed (e.g., via leaching) from the PCD table 1468. In an embodiment, metal-solvent catalyst in the PCD table 1468 may be removed to a selected depth from at least one exterior working surface (e.g., the working surface and/or a sidewall working surface of the PCD table 1468) so that only a portion of the interstitial regions are occupied by metal-solvent catalyst. For example, substantially all or a selected portion of the metal-solvent catalyst may be removed from the PCD table 1468 so-formed in the PCD compact 1470 to a selected depth from the working surface. Leaching the catalyst from the PCD table 1468 may improve the thermal stability of the nozzles 1400 formed from the PCD table 1468. For example, leaching the catalyst from the PCD table 1468 may allow the PCD table to be brazed to the base and/or heated to temperatures of about or greater than 700° C. substantially without thermal degradation. In some embodiments, the catalyst may not be leached from the PCD table 1468 In some embodiments, the catalyst may only be leached from a portion of the PCD table, thereby increasing the thermal stability of the nozzles 1400 formed therefrom.

In another embodiment, a PCD table 1468 may be fabricated according to any of the disclosed embodiments in a first HPHT process, leached to remove substantially all of the metal-solvent catalyst from the interstitial regions between the bonded diamond grains, and subsequently bonded to a substrate in a second HPHT process. In the second HPHT process, an infiltrant from, for example, a cemented carbide substrate may infiltrate into the interstitial regions from which the metal-solvent catalyst was depleted. For example, the infiltrant may be cobalt that is swept-in from a cobalt-cemented tungsten carbide substrate. In one embodiment, the first and/or second HPHT process may be performed at a pressure of at least about 7.5 GPa. In one embodiment, the infiltrant may be leached from the infiltrated PCD table 1468 using a second acid leaching process following the second HPHT process.

In an embodiment, the PCD table 1468 may be a binderless PCD table. The binderless PCD table may be formed by pressing a mass of diamond particles with or without additives such as a catalyst. The diamond particles are pressed without any metal-solvent catalyst being present. For example, the mass of diamond particles may not be disposed on a cobalt-cemented tungsten carbide substrate. The binderless PCD table may be pressed using any of the pressures and temperatures disclosed herein.

In an embodiment, as shown, the substrate 1464 may be removed or otherwise detached from the PCD table 1468. For example, the substrate 1464 may be removed from the PCD table 1468 by grinding the substrate 1464 or dissolving the substrate 1464 in an acid. In an embodiment, not shown, at least a portion of the substrate 1464 may not be removed or otherwise detached from the PCD table 1468. In such an embodiment, the substrate 1464 may form a part of the nozzle(s) formed from the PCD table 1468.

Portions of the PCD table 1468 and, optionally, the substrate 1464 may be removed to form one or more nozzles 1400. For example, portions of the PCD table 1468 and, optionally, the substrate 1464 may be removed (e.g., via laser ablation) to form 1, 2, 3, 4, 5, 6, 7, 8, 9, 10, 11, 12, 13, 14, 15, 16, 17, 18, 19, 20, or greater than 20 nozzles 1400. The number of nozzles 1400 formed from the PCD table 1468 and, optionally, the substrate 1464 may depend on the size (e.g., maximum lateral dimension, thickness, and volume) of the PCD table 1468, the shape of the PCD table 1468, whether the substrate 1464 forms a portion of the nozzles 1400, the size of the nozzles 1400, and the shape of the nozzles 1400. It is noted that the nozzles 1400 formed from the PCD table 1468 and, optionally, the substrate 1464 may include one or more feature that is the same or substantially similar to any of the one or more feature of the nozzles disclosed herein, without limitation.

In an embodiment, the portions of the PCD table 1468 and, optionally, the substrate 1464 may be removed using a laser. In such an embodiment, the laser may emit a plurality of laser pulses towards one or more surfaces of the PCD table 1468 and, optionally, the substrate 1464. The laser pulses may be selected to remove the PCD table 1468 in one or more layers. The laser ablation process may accomplish at least one of the following: form a plurality of nozzles 1400 from the PCD table 1468 (e.g., simultaneously or substantially simultaneously), form the exterior features (e.g., top surface, bottom surface, lateral surface, etc.), form interior features (e.g., conduit) of the nozzle 1400, or polish the surfaces of the nozzles 1400. Examples of lasing methods that may be used to remove portions of the PCD table 1468 are disclosed in U.S. patent application Ser. No. 16/084,469 filed on Jan. 10, 2018, the disclosure of which is incorporated herein, in its entirety, by this reference.

In an embodiment, the portions of the PCD table 1468 and, optionally, the substrate 1464 may be removed using one or more of grinding, lapping, electrical discharge machining (e.g., wire electrical discharge machining), or any other machining technique. Unlike lasing, some machining techniques such as grinding, lapping, and electrical discharge machining may at least one of exhibit high wear due to the hardness of diamond, may be unable to form all of the nozzles 1400 collectively (e.g., in a single process), form both the exterior and interior features of the nozzles 1400, or polish the surfaces of the nozzles 1400. In an embodiment, the portions of the PCD table 1468 and, optionally, the substrate 1464 may be removed using lasing and one or more of grinding, lapping, electrical discharge machining, or any other machining technique.

As previously discussed, the nozzles disclosed herein may be at least partially formed from PcBN instead of or in addition to PCD. More generally, nozzles disclosed herein may comprise one or more superhard material (e.g., PCD, PCBN, silicon carbide, or any material having a hardness exceeding the hardness of tungsten carbide), without limitation. For example, the nozzle may be at least partially formed from PcBN due the hardness and thermal conductivity of PcBN, which is comparable to the hardness and thermal conductivity of PCD. The nozzle formed from PcBN may decrease the wear on the nozzle, may increase the lifespan of the nozzle, may allow the nozzle to be used with abrasive printing materials, and may improve the consistency of the printing material formed using the nozzle. The PcBN may exhibit a thermal stability that is greater than PCD thereby allowing the nozzle formed from PcBN to be heated to greater temperatures than if the nozzle includes PCD. For example, PCD may exhibit thermal degradation when heated to a temperature that is greater than 700° C. when the PCD includes a metal-solvent catalyst and the PcBN may be heated to temperatures that are greater than 700° C. substantially without degradation.

In an embodiment, all of the nozzles may be formed from PcBN. Forming all of the nozzle from PcBN may make manufacturing the nozzle easier since there is no need to attach the PcBN to another material and improve the wear characteristics of the nozzle. In another embodiment, only a portion of the nozzle is formed from PcBN. Forming only a portion of the nozzle from PcBN may make shaping and machining the nozzle easier since the other materials of the nozzle may be less hard than the PcBN. However, forming only a portion of the nozzle from PcBN may require bonding the PcBN to another material, thereby increasing the complexity of manufacturing the nozzle. Also, the fact that portions of the nozzle are formed from a less hard material than PcBN may increase wear on portions of the nozzle that are formed from the less hard material thereby decreasing the lifespan of the nozzle. In an example, when only a portion of the nozzle includes PcBN, at least a portion of the conduit surface 110 and, more particular, the portion of the conduit surface 110 and any other interior surface of the nozzle adjacent to the orifice 114 may be defined by PcBN. In such an example, the PcBN reduces wear of the orifice 114 compared to a less hard material thereby maintaining the consistency of the printing material dispensed from the nozzle than if the nozzle were entirely formed from the less hard material.

The PcBN may be formed by heating boron nitride at any of the same temperatures and pressures discussed above, such as a temperature of about 1000° C. to about 1450° C. and a pressure of about 5 GPa to about 14 GPa. Catalysts for PcBN include, for example, alkali metals, antimony, lead, tin, lithium, magnesium, and nitrides. After forming the PcBN, one or more nozzles may be formed therefrom using the same techniques disclosed above with regards to PCD. For example, the nozzles may be formed by lasing, grinding, lapping, electrical discharge machining, or any other suitable machining technique.

While various aspects and embodiments have been disclosed herein, other aspects and embodiments are contemplated. The various aspects and embodiments disclosed herein are for purposes of illustration and are not intended to be limiting.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A nozzle for three-dimensional printing, the nozzle comprising:
    at least one planar top surface;
    at least one bottom surface opposite the at least one planar top surface;
    at least one lateral outer surface having an at least partially conical shape, an interface between the at least one planar top surface and the at least one lateral outer surface defining a convexly curved surface extending from the at least one planar top surface to the at least one lateral outer surface; and
    at least one conduit surface extending from the at least one planar top surface to the at least one bottom surface, the at least one conduit surface defining a conduit through the nozzle;
    an inner rounded surface at an interface between the at least one planar top surface and the at least one conduit surface;
    an outer rounded surface at an interface between the at least one planar top surface and the at least one lateral outer surface;
    wherein at least a portion of the at least one conduit surface extending to the at least one top surface is non-vertical, the at least a portion of the at least one conduit surface defining a conical portion of the conduit, the conical portion of the conduit defined by the at least a portion of the at least one conduit surface extending radially outward at a common angle to gradually increase a cross-sectional area of the conduit;
    wherein an entirety of the nozzle is at least one of polycrystalline diamond, polycrystalline cubic boron nitride, or a cemented carbide substrate bonded to polycrystalline diamond; and
    wherein at least about 70% of the lateral outer surface is non-vertical.

2. The nozzle of claim 1, wherein the at least a portion of the at least one conduit surface that is non-vertical extends along an axis that is transverse to a central axis of the nozzle.

3. The nozzle of claim 1, wherein the at least one conduit surface is a laser ablated surface.

4. The nozzle of claim 1, wherein the at least one conduit surface exhibits a first conduit surface defining a first conical portion of the conduit and a second conduit surface defining a second conical portion of the conduit, the first conduit surface and the second conduit surface collectively extending from the at least one planar top surface to the at least one bottom surface, the first conduit surface extending from the at least one planar top surface to the second conduit surface, the second conduit surface extending from the first conduit surface towards the at least one bottom surface, the first conduit surface extending at an angle $\theta$ relative to a central axis of the nozzle and the second conduit surface extending at an angle $\phi$ relative to the central axis, wherein the angle $\phi$ is greater than the angle $\theta$ and the angle $\theta$ and the angle $\phi$ are non-zero degree angles.

5. The nozzle of claim 4, wherein the angle $\theta$ is about 4° to about 10°.

6. The nozzle of claim 4, wherein an edge between the first conduit surface and the second conduit surface is curved.

7. The nozzle of claim 4, wherein the at least one conduit surface further includes one or more additional conduit surfaces extending from the second conduit surface to the at least one bottom surface.

8. The nozzle of claim 1, wherein the at least one conduit surface defines an orifice, the orifice exhibiting a non-circular shape.

9. The nozzle of claim 1, wherein the at least one conduit surface defines an orifice, the orifice exhibiting a maximum lateral dimension that is about 1 mm or less.

10. The nozzle of claim 1, wherein the nozzle exhibits a volume greater than 7.5 mm$^3$.

11. The nozzle of claim 1, wherein at least a portion of the at least one conduit surface comprises at least one of polycrystalline diamond or polycrystalline cubic boron nitride.

12. The nozzle of claim 1, further comprising one or more recesses extending inwardly from the at least one planar top surface.

13. The nozzle of claim 1, further comprising one or more protrusions extending outwardly from the at least one planar top surface.

14. The nozzle of claim 1, wherein the inner rounded surface extends from the at least one planar top surface to a first non-vertical portion the at least one conduit surface, and wherein the first non-vertical portion of the at least one conduit surface is adjacent to and offset from a second non-vertical portion of the at least one conduit surface.

15. The nozzle of claim 1, wherein the at least one planar top surface exhibits a first surface area and the outer rounded surface exhibits a second surface area that is equal to or greater than the first surface area.

16. The nozzle of claim 1, wherein the at least one planar top surface is oriented and configured to be non-parallel to a printed material dispensed from the nozzle.

17. A nozzle assembly for three-dimensional printing, comprising:
a base including an attachment portion configured to be attached to a printing device; and
the nozzle of claim 1 attached to the base.

18. A method of using a nozzle in a three-dimensional printing process, the method comprising:
flowing a printing material through the nozzle of claim 1; and
directing flow of the printing material through the conduit of the nozzle.

19. A nozzle for three-dimensional printing, the nozzle comprising:
at least one planar top surface;
at least one bottom surface opposite the at least one planar top surface;
a lateral outer surface; and
at least one conduit surface extending from the at least one planar top surface to the at least one bottom surface, the at least one conduit surface defining a conduit through the nozzle;
wherein at least a portion of the at least one conduit surface extends to the at least one planar top surface along an axis that is transverse to a central axis of the nozzle, the at least a portion of the at least one conduit surface defining a first frustoconical portion of the conduit and a second frustoconical portion of the conduit positioned adjacent to each other, each of the first frustoconical portion of the conduit and the second frustoconical portion of the conduit extending radially outward to gradually increase a cross-sectional area of the conduit; and
wherein at least a portion of the at least one conduit surface is a laser ablated surface;
wherein an entirety of the nozzle is at least one superhard material;
wherein a first convexly curved surface extends between the at least one planar top surface and the lateral outer surface at a distal end of the nozzle and a second convexly curved surface extends between the at least one planar top surface and the at least one conduit surface at the distal end of the nozzle; and
wherein at least about 70% of the lateral outer surface is non-vertical.

20. A nozzle for three-dimensional printing, the nozzle comprising:
a top surface;
a bottom surface opposite the top surface;
a lateral outer surface;
a convexly curved surface extending between and connecting the top surface and the lateral outer surface; and
at least one conduit surface extending from the top surface to the bottom surface, the at least one conduit surface defining a conduit through the nozzle;
another convexly curved surface extending between and connecting the top surface and the at least one conduit surface;
wherein at least a portion of the at least one conduit surface extends along an axis that is transverse to a central axis of the nozzle;
wherein an entirety of the nozzle is at least one of polycrystalline diamond, polycrystalline cubic boron nitride, or a cemented carbide substrate bonded to polycrystalline diamond; and
wherein the lateral outer surface is conically shaped.

21. The nozzle of claim 1, wherein at least about 80% of the lateral outer surface is non-vertical.

22. The nozzle of claim 21, wherein at least about 90% of the lateral outer surface is non-vertical.

23. The nozzle of claim 22, wherein about 100% of the lateral outer surface is non-vertical.

24. A nozzle for three-dimensional printing, the nozzle comprising:
at least one planar top surface;
at least one bottom surface opposite the at least one planar top surface;
at least one lateral outer surface having an at least partially conical shape, an interface between the at least one planar top surface and the at least one lateral outer surface defining a convexly curved surface extending from the at least one planar top surface to the at least one lateral outer surface; and
at least one conduit surface extending from the at least one planar top surface to the at least one bottom surface, the at least one conduit surface defining a conduit through the nozzle;
an inner rounded surface at an interface between the at least one planar top surface and the at least one conduit surface;
an outer rounded surface at an interface between the at least one planar top surface and the at least one lateral outer surface;
wherein at least a portion of the at least one conduit surface extending to the at least one top surface is non-vertical, the at least a portion of the at least one conduit surface defining a conical portion of the conduit, the conical portion of the conduit defined by the at least a portion of the at least one conduit surface extending radially outward at a common angle to gradually increase a cross-sectional area of the conduit;
wherein an entirety of the nozzle is at least one of polycrystalline diamond, polycrystalline cubic boron nitride, or a cemented carbide substrate bonded to polycrystalline diamond; and
wherein substantially all of the lateral outer surface is a conically shaped surface.

25. The nozzle of claim 1, wherein the at least one planar top surface is a polished surface.

26. The nozzle of claim 25, wherein the at least one planar top surface exhibits a root mean square surface roughness that is about 15 nm or less.

27. The nozzle of claim 1, wherein the at least one bottom surface is a polished surface.

28. The nozzle of claim 27, wherein the at least one bottom surface exhibits a root mean square surface roughness that is about 15 nm or less.

29. The nozzle of claim 1, wherein the lateral outer surface is a polished surface.

30. The nozzle of claim 29, wherein the lateral outer surface exhibits a root mean square surface roughness that is about 15 nm or less.

31. A nozzle assembly for three-dimensional printing, comprising:
a base including a recess; and
the nozzle of claim 1 secured within the recess via swaging.

32. The nozzle assembly of claim 31, wherein the base includes a wall extending radially inwardly over the lateral outer surface of the nozzle and securing the nozzle within the recess.

* * * * *